United States Patent
Tidwell et al.

(10) Patent No.: US 9,178,634 B2
(45) Date of Patent: *Nov. 3, 2015

(54) METHODS AND APPARATUS FOR EVALUATING AN AUDIENCE IN A CONTENT-BASED NETWORK

(75) Inventors: Justin Tidwell, Waxhaw, NC (US); Eduardo G. Samame, Rowayton, CT (US); Bryan Santangelo, Tulsa, OK (US)

(73) Assignee: Time Warner Cable Enterprises LLC, New York, NY (US)

( * ) Notice: Subject to any disclaimer, the term of this patent is extended or adjusted under 35 U.S.C. 154(b) by 566 days.

This patent is subject to a terminal disclaimer.

(21) Appl. No.: 12/503,749

(22) Filed: Jul. 15, 2009

(65) Prior Publication Data

US 2011/0016482 A1    Jan. 20, 2011

(51) Int. Cl.

| | |
|---|---|
| *H04H 60/45* | (2008.01) |
| *G06Q 30/00* | (2012.01) |
| *G06Q 30/02* | (2012.01) |
| *H04H 20/10* | (2008.01) |
| *H04H 60/06* | (2008.01) |
| *H04H 60/31* | (2008.01) |
| *H04H 60/66* | (2008.01) |
| *H04N 21/442* | (2011.01) |

(52) U.S. Cl.
CPC ............... *H04H 60/45* (2013.01); *G06Q 30/00* (2013.01); *G06Q 30/0251* (2013.01); *G06Q 30/0254* (2013.01); *H04H 20/103* (2013.01); *H04H 60/06* (2013.01); *H04H 60/31* (2013.01); *H04H 60/66* (2013.01); *H04N 21/44222* (2013.01)

(58) Field of Classification Search
CPC .................................................. H04N 21/44222
See application file for complete search history.

(56) References Cited

U.S. PATENT DOCUMENTS

| | | | |
|---|---|---|---|
| 4,546,382 A | 10/1985 | McKenna et al. |
| 4,602,279 A | 7/1986 | Freeman |
| 4,905,080 A | 2/1990 | Watanabe et al. |
| 4,930,120 A | 5/1990 | Baxter et al. |

(Continued)

FOREIGN PATENT DOCUMENTS

WO    WO 01/91474    11/2001

OTHER PUBLICATIONS

Tandberg Television specification entitled "*AdPoint® Advanced Advertising Platform*" dated Mar. 2008. 2 pages.

(Continued)

*Primary Examiner* — Mark D Featherstone
(74) *Attorney, Agent, or Firm* — Gazdzinski & Associates PC

(57) ABSTRACT

Methods and apparatus for identifying, creating and distributing audience qualities and other information to an advertisement management system and/or an advertisement decision maker. In one embodiment, the methods and apparatus of the invention provide a technique for classifying data collected about an audience, and creating and grouping qualifiers to those classifications. The invention further includes methods and apparatus for managing an advertising inventory via a management system. The inventory is defined in one variant by predicted or known secondary content insertion opportunities, and a particular audience of the primary content associated with the insertion opportunity. Subscriber privacy and anonymity is also optionally maintained via e.g., hashing or encrypting data relating to the CPE and/or subscriber, thus ensuring that audience data is not traceable to a specific user account.

20 Claims, 11 Drawing Sheets

(56) References Cited

U.S. PATENT DOCUMENTS

| | | |
|---|---|---|
| 5,155,591 A | 10/1992 | Wachob |
| 5,373,315 A | 12/1994 | Dufresne et al. |
| 5,481,294 A | 1/1996 | Thomas et al. |
| 5,497,185 A | 3/1996 | Dufresne et al. |
| 5,600,364 A | 2/1997 | Hendricks et al. |
| 5,675,647 A | 10/1997 | Garneau et al. |
| 5,758,257 A | 5/1998 | Herz et al. |
| 5,774,170 A | 6/1998 | Hite et al. |
| 5,793,409 A | 8/1998 | Tetsumura |
| 5,812,642 A | 9/1998 | Leroy |
| 5,914,945 A | 6/1999 | Abu-Amara et al. |
| 5,929,849 A | 7/1999 | Kikinis |
| 5,956,037 A | 9/1999 | Osawa et al. |
| 5,974,299 A | 10/1999 | Massetti |
| 6,002,393 A | 12/1999 | Hite et al. |
| 6,029,045 A | 2/2000 | Picco et al. |
| 6,047,327 A | 4/2000 | Tso et al. |
| 6,081,830 A | 6/2000 | Schindler |
| 6,088,722 A | 7/2000 | Herz et al. |
| 6,134,532 A | 10/2000 | Lazarus et al. |
| 6,161,142 A | 12/2000 | Wolfe et al. |
| 6,177,931 B1 | 1/2001 | Alexander et al. |
| 6,182,050 B1 | 1/2001 | Ballard |
| 6,202,210 B1 | 3/2001 | Ludtke |
| 6,216,129 B1 | 4/2001 | Eldering |
| 6,272,176 B1 | 8/2001 | Srinivasan |
| 6,282,713 B1 | 8/2001 | Kitsukawa et al. |
| 6,446,261 B1 | 9/2002 | Rosser |
| 6,463,585 B1 | 10/2002 | Hendricks et al. |
| 6,467,089 B1 | 10/2002 | Aust et al. |
| 6,502,076 B1 | 12/2002 | Smith |
| 6,549,718 B1 | 4/2003 | Grooters et al. |
| 6,560,578 B2 | 5/2003 | Eldering |
| 6,604,138 B1 | 8/2003 | Viirine et al. |
| 6,615,039 B1 | 9/2003 | Eldering |
| 6,615,251 B1 | 9/2003 | Klug et al. |
| 6,647,548 B1 | 11/2003 | Lu et al. |
| 6,671,736 B2 | 12/2003 | Virine et al. |
| 6,681,393 B1 | 1/2004 | Bauminger et al. |
| 6,687,735 B1 | 2/2004 | Logston et al. |
| 6,704,930 B1 | 3/2004 | Eldering et al. |
| 6,718,551 B1 | 4/2004 | Swix et al. |
| 6,738,978 B1 | 5/2004 | Hendricks et al. |
| 6,771,290 B1 | 8/2004 | Hoyle |
| 6,813,776 B2 | 11/2004 | Chernock et al. |
| 6,859,845 B2 | 2/2005 | Mate |
| 6,898,762 B2 | 5/2005 | Ellis et al. |
| 6,901,606 B2 | 5/2005 | Wright et al. |
| 6,909,837 B1 | 6/2005 | Unger |
| 6,915,528 B1 | 7/2005 | McKenna |
| 6,990,680 B1 | 1/2006 | Wugofski |
| 7,017,179 B1 | 3/2006 | Asamoto et al. |
| 7,039,928 B2 | 5/2006 | Kamada et al. |
| 7,075,945 B2 | 7/2006 | Arsenault et al. |
| 7,100,183 B2 | 8/2006 | Kunkel et al. |
| 7,109,848 B2 | 9/2006 | Schybergson |
| 7,143,431 B1 | 11/2006 | Eager et al. |
| 7,146,627 B1 | 12/2006 | Ismail et al. |
| 7,152,237 B2 | 12/2006 | Flickinger et al. |
| 7,155,508 B2 | 12/2006 | Sankuratipati et al. |
| 7,174,126 B2 | 2/2007 | McElhattan |
| 7,197,472 B2 | 3/2007 | Conkwright et al. |
| 7,222,078 B2 | 5/2007 | Abelow |
| 7,228,555 B2 | 6/2007 | Schlack |
| 7,237,250 B2 | 6/2007 | Kanojia et al. |
| 7,246,150 B1 | 7/2007 | Donoho et al. |
| 7,246,172 B2 | 7/2007 | Yoshiba et al. |
| 7,266,836 B2 | 9/2007 | Anttila et al. |
| 7,280,737 B2 | 10/2007 | Smith |
| 7,281,261 B2 | 10/2007 | Jaff et al. |
| 7,317,728 B2 | 1/2008 | Acharya et al. |
| 7,327,692 B2 | 2/2008 | Ain et al. |
| 7,352,775 B2 | 4/2008 | Powell |
| 7,355,980 B2 | 4/2008 | Bauer et al. |
| 7,356,751 B1 | 4/2008 | Levitan |
| 7,363,371 B2 | 4/2008 | Kirkby et al. |
| 7,363,643 B2 | 4/2008 | Drake et al. |
| 7,367,043 B2 | 4/2008 | Dudkiewicz et al. |
| 7,369,750 B2 | 5/2008 | Cheng et al. |
| 7,457,520 B2 | 11/2008 | Rossetti |
| 7,577,118 B2 | 8/2009 | Haumonte et al. |
| 7,602,820 B2 | 10/2009 | Helms |
| 7,603,529 B1 | 10/2009 | MacHardy |
| 7,712,125 B2 | 5/2010 | Herigstad et al. |
| 7,720,432 B1 | 5/2010 | Colby et al. |
| 7,729,940 B2 | 6/2010 | Harvey et al. |
| 7,730,509 B2 | 6/2010 | Boulet |
| 7,801,803 B2 | 9/2010 | Forlai |
| 7,900,229 B2 | 3/2011 | Dureau |
| 8,028,322 B2 | 9/2011 | Riedl et al. |
| 8,042,131 B2 | 10/2011 | Flickinger |
| 8,065,703 B2 | 11/2011 | Wilson |
| 8,099,757 B2 | 1/2012 | Riedl et al. |
| 8,205,226 B2 | 6/2012 | Ko et al. |
| 8,214,256 B2 | 7/2012 | Riedl et al. |
| 8,296,185 B2 | 10/2012 | Isaac |
| 8,347,341 B2 | 1/2013 | Markley et al. |
| 8,365,213 B1 | 1/2013 | Orlowski |
| 8,396,055 B2 | 3/2013 | Patel |
| 8,516,529 B2 | 8/2013 | Lajoie et al. |
| 8,561,113 B2 | 10/2013 | Cansler et al. |
| 8,571,931 B2 | 10/2013 | Riedl et al. |
| 8,621,501 B2 | 12/2013 | Matheny et al. |
| 8,769,559 B2 | 7/2014 | Moon et al. |
| 2001/0001160 A1 | 5/2001 | Shoff et al. |
| 2001/0013123 A1 | 8/2001 | Freeman et al. |
| 2002/0026496 A1 | 2/2002 | Boyer et al. |
| 2002/0032754 A1 | 3/2002 | Logston et al. |
| 2002/0049902 A1 | 4/2002 | Rhodes |
| 2002/0069404 A1 | 6/2002 | Copeman et al. |
| 2002/0073419 A1 | 6/2002 | Yen et al. |
| 2002/0078441 A1* | 6/2002 | Drake et al. .................. 725/9 |
| 2002/0078444 A1* | 6/2002 | Krewin et al. .................. 725/35 |
| 2002/0087975 A1 | 7/2002 | Schlack |
| 2002/0087976 A1 | 7/2002 | Kaplan et al. |
| 2002/0100063 A1 | 7/2002 | Herigstad et al. |
| 2002/0104083 A1 | 8/2002 | Hendricks et al. |
| 2002/0112240 A1 | 8/2002 | Basco et al. |
| 2002/0120498 A1 | 8/2002 | Gordon |
| 2002/0123928 A1 | 9/2002 | Eldering et al. |
| 2002/0124182 A1 | 9/2002 | Basco et al. |
| 2002/0144263 A1 | 10/2002 | Eldering et al. |
| 2002/0147984 A1 | 10/2002 | Tomsen et al. |
| 2002/0166119 A1 | 11/2002 | Cristofalo |
| 2002/0174430 A1 | 11/2002 | Ellis et al. |
| 2002/0178445 A1 | 11/2002 | Eldering et al. |
| 2002/0178447 A1 | 11/2002 | Plotnick et al. |
| 2002/0184629 A1 | 12/2002 | Sie et al. |
| 2002/0184634 A1 | 12/2002 | Cooper |
| 2002/0184635 A1 | 12/2002 | Istvan |
| 2003/0004810 A1 | 1/2003 | Eldering |
| 2003/0005446 A1 | 1/2003 | Jaff et al. |
| 2003/0018977 A1 | 1/2003 | McKenna |
| 2003/0020744 A1 | 1/2003 | Ellis et al. |
| 2003/0030751 A1 | 2/2003 | Lupulescu et al. |
| 2003/0033199 A1 | 2/2003 | Coleman |
| 2003/0056217 A1 | 3/2003 | Brooks |
| 2003/0093311 A1 | 5/2003 | Knowlson |
| 2003/0093784 A1 | 5/2003 | Dimitrova et al. |
| 2003/0093790 A1 | 5/2003 | Logan et al. |
| 2003/0093792 A1 | 5/2003 | Labeeb |
| 2003/0101449 A1 | 5/2003 | Bentolila et al. |
| 2003/0101451 A1 | 5/2003 | Bentolila et al. |
| 2003/0101454 A1 | 5/2003 | Ozer et al. |
| 2003/0110499 A1 | 6/2003 | Knudson |
| 2003/0110503 A1 | 6/2003 | Perkes |
| 2003/0115601 A1 | 6/2003 | Palazzo et al. |
| 2003/0135513 A1 | 7/2003 | Quinn et al. |
| 2003/0145323 A1 | 7/2003 | Hendricks et al. |
| 2003/0149975 A1 | 8/2003 | Eldering et al. |
| 2003/0149990 A1 | 8/2003 | Anttila et al. |
| 2003/0149993 A1 | 8/2003 | Son et al. |
| 2003/0172376 A1 | 9/2003 | Coffin, III |
| 2003/0217365 A1 | 11/2003 | Caputo |

(56) References Cited

U.S. PATENT DOCUMENTS

| | | |
|---|---|---|
| 2003/0237090 A1 | 12/2003 | Boston et al. |
| 2004/0034873 A1 | 2/2004 | Zenoni |
| 2004/0047599 A1 | 3/2004 | Grzeczkowski |
| 2004/0060076 A1 | 3/2004 | Song |
| 2004/0073915 A1 | 4/2004 | Dureau |
| 2004/0078809 A1 | 4/2004 | Drazin |
| 2004/0117817 A1 | 6/2004 | Kwon et al. |
| 2004/0133467 A1 | 7/2004 | Siller |
| 2004/0138909 A1 | 7/2004 | Mayer |
| 2004/0148625 A1* | 7/2004 | Eldering et al. ............. 725/34 |
| 2004/0163111 A1 | 8/2004 | Palazzo et al. |
| 2004/0177383 A1 | 9/2004 | Martinolich et al. |
| 2004/0181811 A1 | 9/2004 | Rakib |
| 2004/0186774 A1 | 9/2004 | Lee |
| 2004/0199789 A1 | 10/2004 | Shaw et al. |
| 2005/0022237 A1 | 1/2005 | Nomura |
| 2005/0027696 A1 | 2/2005 | Swaminathan et al. |
| 2005/0028208 A1 | 2/2005 | Ellis et al. |
| 2005/0034171 A1 | 2/2005 | Benya |
| 2005/0039205 A1 | 2/2005 | Riedl et al. |
| 2005/0060742 A1 | 3/2005 | Riedl |
| 2005/0060745 A1 | 3/2005 | Riedl |
| 2005/0086691 A1 | 4/2005 | Dudkiewicz et al. |
| 2005/0105396 A1 | 5/2005 | Schybergson |
| 2005/0114900 A1 | 5/2005 | Ladd |
| 2005/0144635 A1 | 6/2005 | Boortz |
| 2005/0210502 A1 | 9/2005 | Flickinger et al. |
| 2005/0223409 A1 | 10/2005 | Rautila et al. |
| 2005/0229209 A1 | 10/2005 | Hildebolt et al. |
| 2005/0234998 A1 | 10/2005 | Lesandrini et al. |
| 2005/0235318 A1 | 10/2005 | Grauch et al. |
| 2005/0262542 A1 | 11/2005 | DeWeese et al. |
| 2005/0273819 A1 | 12/2005 | Knudson et al. |
| 2005/0289588 A1 | 12/2005 | Kinnear |
| 2006/0019702 A1 | 1/2006 | Anttila et al. |
| 2006/0031883 A1 | 2/2006 | Ellis et al. |
| 2006/0036750 A1 | 2/2006 | Ladd |
| 2006/0080408 A1 | 4/2006 | Istvan et al. |
| 2006/0117341 A1 | 6/2006 | Park |
| 2006/0171390 A1 | 8/2006 | La Joie |
| 2006/0171423 A1 | 8/2006 | Helms |
| 2006/0190336 A1 | 8/2006 | Pisaris-Henderson et al. |
| 2006/0218604 A1 | 9/2006 | Riedl |
| 2006/0248555 A1 | 11/2006 | Eldering |
| 2006/0253328 A1 | 11/2006 | Kohli et al. |
| 2006/0253584 A1 | 11/2006 | Dixon et al. |
| 2006/0253864 A1 | 11/2006 | Easty |
| 2006/0259924 A1 | 11/2006 | Boortz |
| 2006/0277569 A1 | 12/2006 | Smith |
| 2006/0288374 A1 | 12/2006 | Ferris et al. |
| 2006/0294259 A1 | 12/2006 | Matefi et al. |
| 2007/0022459 A1 | 1/2007 | Gaebel |
| 2007/0029379 A1 | 2/2007 | Peyer |
| 2007/0033531 A1 | 2/2007 | Marsh |
| 2007/0074258 A1 | 3/2007 | Wood et al. |
| 2007/0076728 A1 | 4/2007 | Rieger et al. |
| 2007/0089127 A1 | 4/2007 | Flickinger et al. |
| 2007/0094691 A1 | 4/2007 | Gazdzinski |
| 2007/0113243 A1 | 5/2007 | Brey |
| 2007/0115389 A1 | 5/2007 | McCarthy et al. |
| 2007/0150919 A1 | 6/2007 | Morishita |
| 2007/0157242 A1 | 7/2007 | Cordray et al. |
| 2007/0204310 A1 | 8/2007 | Hua et al. |
| 2007/0217436 A1 | 9/2007 | Markley |
| 2007/0233857 A1 | 10/2007 | Cheng et al. |
| 2007/0244760 A1* | 10/2007 | Bodnar et al. ............. 705/14 |
| 2007/0276926 A1 | 11/2007 | LaJoie |
| 2008/0052157 A1 | 2/2008 | Kadambi et al. |
| 2008/0092181 A1 | 4/2008 | Britt |
| 2008/0115169 A1 | 5/2008 | Ellis et al. |
| 2008/0124056 A1 | 5/2008 | Concotelli |
| 2008/0147497 A1 | 6/2008 | Tischler |
| 2008/0163305 A1 | 7/2008 | Johnson et al. |
| 2008/0192820 A1 | 8/2008 | Brooks |
| 2008/0229354 A1 | 9/2008 | Morris et al. |
| 2008/0263578 A1 | 10/2008 | Bayer et al. |
| 2008/0271068 A1 | 10/2008 | Ou et al. |
| 2008/0273591 A1 | 11/2008 | Brooks |
| 2008/0313671 A1 | 12/2008 | Batrouny et al. |
| 2008/0313691 A1* | 12/2008 | Cholas et al. ............. 725/131 |
| 2009/0030802 A1 | 1/2009 | Plotnick et al. |
| 2009/0132346 A1* | 5/2009 | Duggal et al. ............. 705/10 |
| 2009/0187939 A1 | 7/2009 | LaJoie |
| 2009/0210899 A1 | 8/2009 | Lawrence-Apfelbaum et al. |
| 2009/0319379 A1* | 12/2009 | Joao ............. 705/14.73 |
| 2009/0320059 A1 | 12/2009 | Bolyukh |
| 2010/0161492 A1 | 6/2010 | Harvey et al. |
| 2010/0175084 A1 | 7/2010 | Ellis et al. |
| 2010/0251304 A1 | 9/2010 | Donoghue |
| 2010/0251305 A1 | 9/2010 | Kimble |
| 2010/0262488 A1 | 10/2010 | Harrison et al. |
| 2010/0269131 A1 | 10/2010 | Newberry et al. |
| 2010/0313225 A1 | 12/2010 | Cholas et al. |
| 2011/0015989 A1 | 1/2011 | Tidwell |
| 2011/0016479 A1 | 1/2011 | Tidwell |
| 2011/0016482 A1 | 1/2011 | Tidwell et al. |
| 2011/0093900 A1 | 4/2011 | Patel et al. |
| 2011/0103374 A1 | 5/2011 | Lajoie et al. |
| 2011/0107364 A1 | 5/2011 | Lajoie et al. |
| 2011/0107379 A1 | 5/2011 | Lajoie et al. |
| 2011/0178880 A1 | 7/2011 | Karaoguz et al. |
| 2011/0231265 A1 | 9/2011 | Brown et al. |
| 2011/0307339 A1 | 12/2011 | Russell et al. |
| 2011/0317977 A1 | 12/2011 | Harris |
| 2012/0011269 A1 | 1/2012 | Krikorian et al. |
| 2012/0084813 A1 | 4/2012 | Dmitriev et al. |
| 2012/0110620 A1 | 5/2012 | Kilar et al. |
| 2013/0227608 A1 | 8/2013 | Evans et al. |
| 2014/0020017 A1 | 1/2014 | Stern et al. |

OTHER PUBLICATIONS

Open Cable™ Specification entitled "*Enhanced TV Binary Interchange Format 1.0*" OC-SP-ETV-BIF 1.0-106-110128 dated Jan. 28, 2011, 408 pages.

* cited by examiner

METHODS AND APPARATUS FOR EVALUATING AN AUDIENCE IN A CONTENT-BASED NETWORK

RELATED APPLICATIONS

This application is related to commonly owned U.S. patent application Ser. No. 12/503,710 filed concurrently herewith and entitled "METHODS AND APPARATUS FOR TARGETED SECONDARY CONTENT INSERTION" and to commonly owned U.S. patent application Ser. No. 12/503,772 filed concurrently herewith and entitled "METHODS AND APPARATUS FOR CLASSIFYING AN AUDIENCE IN A CONTENT-BASED NETWORK", each of the foregoing being incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

1. Field of Invention

The invention relates generally to the field of computer-assisted data manipulation and analysis. Specifically, in one exemplary aspect, the invention relates to methods and apparatus for collection and classification of data regarding an audience in a content-based network such as a cable television or satellite network.

2. Description of Related Technology

"Nielsen Ratings" are a well known system of evaluating the viewing habits of cross sections of the population. When collecting Nielsen ratings, companies use statistical techniques to develop a sample population which is a cross section of a larger national population. Theoretically, the viewing habits of the sample population will minor the larger population. The companies then measure the populations viewing habits to identify, among other things, what programs the population is watching as well as the time and frequency at which those programs are watched. This information is then extrapolated to gain insight on the viewing habits of the larger population. Historically, the Nielsen system has been the primary source of audience measurement information in the television industry. The Nielsen system, therefore, affects various aspects of television including inter alia, advertising rates, schedules, viability of particular shows, etc., and has been also recently expanded from measuring an audience of program content to measuring an audience of advertising (i.e., Nielsen ratings may be provided for advertisements themselves).

The Nielson system collects data regarding audiences via either (i) by asking viewers of various demographics to keep a written record of the television shows they watch throughout the day and evening, or (ii) by using "set meters," which are small devices connected to televisions in selected homes which electronically gather the viewing habits of the home and transmit the information nightly to Nielsen or a proxy entity over a connected phone line or other connection.

There are several disadvantages to the Nielsen approach. First, the sample of viewers selected may not be fairly representative of the population of viewers (or the subset of cable viewers) as a whole. For example, in a cable network comprising four million cable viewers, a sample of any 100,000 viewers may exhibit different average viewing habits than the averages associated with the other 3,900,000 cable viewers who are not in the sample.

Second, static delivery makes it difficult to precisely target an audience that is known to be in the market. For example, suppose that the ideal target for a sports car advertisement is the set of all consumers who like and would be interested in buying sports cars. If all that is known from Nielsen data is that 10% of the sample group has watched the auto-racing channel for over three hours in the last month, this may not perfectly correlate with set of consumers who like sports cars. This may be the case, for example, if there are some consumers who are in the market for sports cars but who never watch the auto racing channel, or if there are some viewers of the auto racing channel who have no interest in buying or owning sports cars. As such, patterns based on viewership data often imprecisely identify the desired audience.

Furthermore, the Nielson system is disadvantageously program-specific. Program-specific audience data collection is problematic from the standpoint that this program-coupled approach is only as good as the underlying demographic correlation model. For example, assuming a demographic of 18-30 year old females typically tune in to American Idol each broadcast (e.g., Monday at 8:00 pm), this same demographic may not have any interest in watching the program immediately preceding or following American Idol, and hence may tune away (or delay tuning to that channel until the start of America Idol).

Another disability of the Nielson approach is that it tends to aggregate data or results for given premises (e.g., households) as opposed to providing data for specific users of that premises. For example, the switching activity associated with a given settop box for a family of five represents switching activity for each member of that family (including perhaps viewing of cartoons for a child, teen-related programs for a teenager, and adult-related content for one or more adults). Hence, the data obtained using Nielsen techniques may be somewhat of an amalgam of the data for individual users, and various combinations thereof. Though certain so called "people meters" may be utilized for the precise identification of a viewer such as by age, sex, etc.

For media content providers such as cable and satellite companies and the like, a major issue is how to more accurately target population segments for advertising campaigns based on particular characteristics of an audience, opportunities for insertion (or replacement) of an advertisement, and other factors. It is most desirable for advertisers to have advertisements for products that are targeted to a particular demographic to be viewed by that demographic.

Therefore, there is a need for improved methods and apparatus which do not require or rely solely on population sampling or trend analysis based on a sample population, in order to more accurately generate and analyze audience measurement data. Such improved methods and apparatus would ideally be adapted to gather audience information in real-time or near-real time with associated viewership actions of actual viewers. Exemplary methods would obtain audience information directly from customer's premises equipment (i.e. set top boxes, cable modems etc.), for each individual box or even on a per-user basis where possible, thereby allowing a content provider to gather specific information in large quantities across a broad geographical area. Ideally, these methods and apparatus would be able to monitor multiple sources of content to which viewership behavior relates, and also maintain subscriber anonymity or privacy (i.e., no use of personally identifiable information).

These features would also be provided using substantially extant network infrastructure and components, and would be compatible with a number of different client device and delivery systems including both wired and wireless technologies.

SUMMARY OF THE INVENTION

The present invention addresses the foregoing needs by providing, inter alia, methods and apparatus adapted to increase the effectiveness of advertising or promotional content to be delivered over a network to one or more network devices and associated users.

In one aspect of the invention, a content management apparatus for use within a content delivery network is disclosed. In one embodiment, the apparatus comprises: an advertising subsystem having an advertising content store, the advertising subsystem being configured to identify at least one advertising placement opportunity in delivered content; a data collection subsystem; a processing subsystem in data communication with the collection subsystem; and a data storage subsystem in data communication with the processing subsystem. The data collection subsystem is configured to gather user-related data, and the processing subsystem is configured to process the user-related data and generate an advertising product based at least in part on the processed user-related data and the at least one placement opportunity.

In one variant, the processing subsystem comprises: an enrichment module configured to enrich the collected user-related data in at least one aspect; and an anonymization module configured to substantially anonymize at least portions of the enriched user-related data. The anonymized and enriched user data is stored in the data storage subsystem based on e.g., at least one anonymous identifier (such as for example a cryptographic hash of at least one of: (i) a MAC address associated with a CPE of a user; and (ii) a tuner-related variable).

In another variant, the advertising content store comprises a plurality advertisements or promotions from various different advertisers. At least a portion of the plurality advertisements or promotions from various different advertisers may also include descriptive metadata associated therewith. The metadata may be used by the processing subsystem in identifying potential candidate advertisements or promotions for a given one of the at least one placement opportunity. Alternatively, the metadata may be used by the processing subsystem in determining suitability of a given advertisement or promotion for the advertising product, or for yet other purposes.

In a further variant, the advertising product comprises an advertising inventory element, the element comprising: (i) data regarding at least one placement opportunity; and (ii) data regarding at least one of a user demographic or psychographic associated with the opportunity.

In a second aspect of the invention, a method of generating an inventory element in a content delivery network is disclosed. In one embodiment, the method comprises: determining an opportunity for placement of at least one of a plurality of advertisements in a content stream; determining one or more qualities of an audience of the opportunity for placement; and generating an inventory element comprising a synthesis of the one or more qualities of the audience and the opportunity for placement.

In one variant, the one or more qualities of the audience comprise one or more of psychographic, geographic, demographic, and/or behavioral data.

In another variant, the method further comprises selecting one of the plurality of advertisements based at least in part on a relationship of the one advertisement to the one or more qualities of the audience. The selection is further based at least in part on e.g., one or more factors regarding potential for revenue.

In yet another variant, the method further comprises generating a ranked list of the plurality of advertisements based at least in part on the relationship.

In a further variant, the inventory element comprises a prioritized list of the plurality of advertisements, a priority of the list based at least in part on a relationship between the one or more qualities of an audience of the opportunity for placement and one or more attributes of a target audience of each of the advertisements.

In a third aspect of the invention, computer readable apparatus comprising media adapted to contain a computer program is disclosed. In one embodiment, the program has a plurality of instructions, which, when executed: determine one or more opportunities for insertion of one or more of a plurality of available advertisements; access data regarding a plurality of users; and generate an output comprising an inventory of individual ones of the one or more opportunities for insertion having a plurality of users associated therewith sharing one or more characteristics with at least one of the plurality of available advertisements.

In one variant, the apparatus comprises a hard disk drive of a computerized host apparatus, the host apparatus being in data communication with a two-way content based network.

In another variant, the computer program further comprises instructions which, when executed, cause at least a portion of the generated output to be transmitted to an entity which posts or makes the inventory available to at least one advertiser. For instance, the transmission to an entity which posts or makes the inventory available to at least one advertiser may comprise formatting the at least portion of the generated output according to a data structure or protocol which permits machine reading of the at least portion of generated output.

In another variant, the access of data regarding a plurality of users comprises accessing a data file relating to the activities of one or more subscribers of a content based network, the data file comprising information collected from one or more customer premises equipment associated with respective ones of the subscribers.

In a fourth aspect of the invention, a method of doing business in a content-based network is disclosed. In one embodiment, the method comprises: determining one or more opportunities for placement of secondary content, the placement opportunities each comprising an audience; collecting data regarding the audience of each of the placement opportunities, the data comprising one or more characteristics; and charging a secondary content source a premium to receive the collected data regarding the audience of each of the placement opportunities.

In one variant, the data regarding an audience comprises information regarding at least one of: tuning event information; and user activities taken with respect to content.

In another variant, the method further comprises grouping the audience based on at least one classification.

In yet another variant, the at least one classification comprises at least one of a demographics or psychographic classification.

In a further variant, the secondary content comprises an advertisement or promotional segment.

In still another variant, the secondary content source is selected based at least in part on a level of similarity between a product or service of the secondary content and the one or more characteristics, and the method further comprises providing the audience secondary content from the secondary content source at the placement opportunity.

In a fifth aspect of the invention, a method of generating advertising revenue is disclosed. In one embodiment, the method comprises: obtaining first data regarding the activity of a plurality of users of a content delivery network; obtaining second data regarding at least one advertising placement opportunity; qualifying the users with respect to a qualification metric based at least in part on the first data; generating a product describing the placement opportunity and at least one qualification of the users; and allowing one or more advertisers to purchase the product for consideration.

In a sixth aspect of the invention, CPE adapted to collect and transmit data useful in targeted advertising or promotion delivery is disclosed. In one embodiment, the CPE comprises a cable or satellite digital settop box having client software running thereon, the client software being configured to provide requisite data to a network (e.g., headend) system via e.g., upstream/OOB communications.

These and other features and advantages of the present invention will immediately be recognized by persons of ordinary skill in the art with reference to the attached drawings and detailed description of exemplary embodiments as given below.

DETAILED DESCRIPTION OF THE INVENTION

Figure 1:
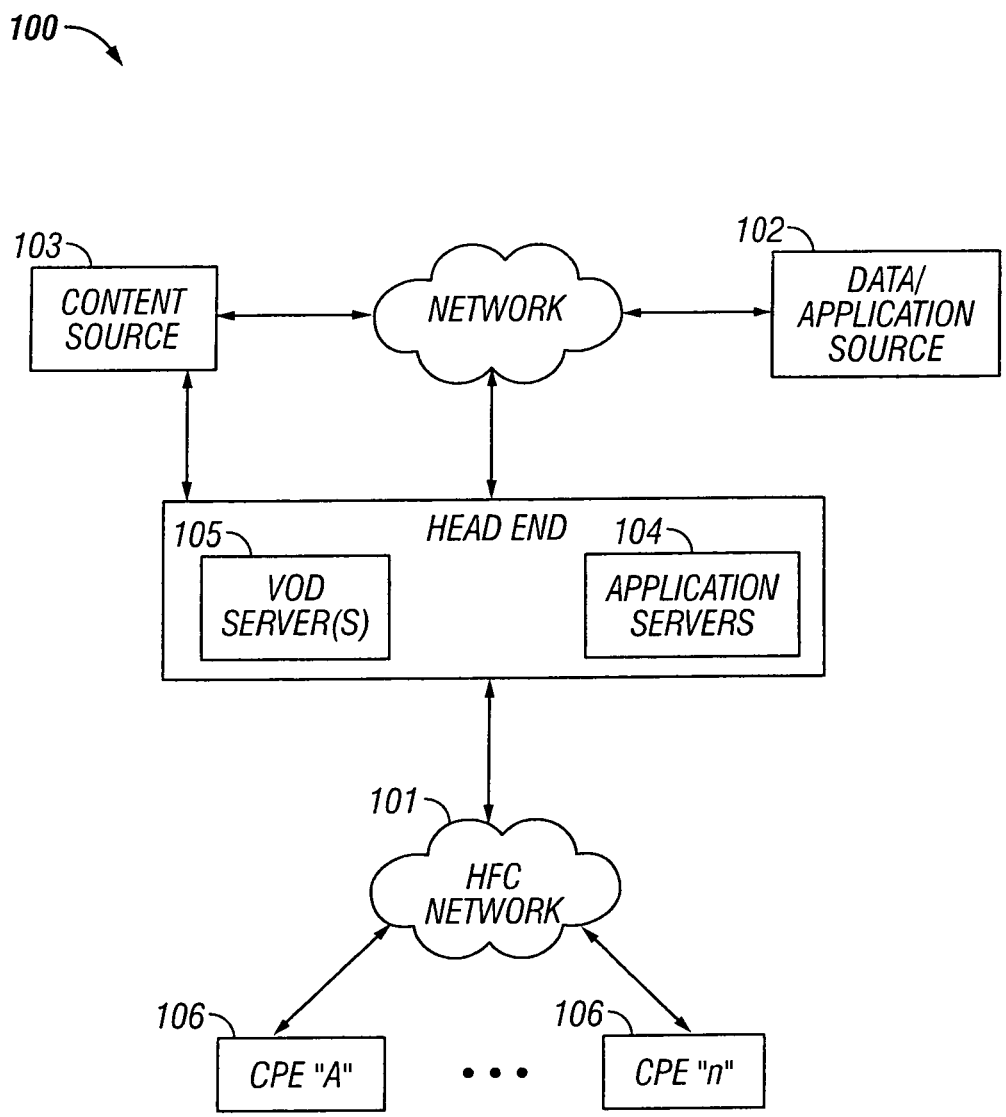
FIG. 1 is a functional block diagram illustrating an exemplary HFC cable network configuration useful with the present invention.

Reference is now made to the drawings, wherein like numerals refer to like parts throughout.

As used herein, the term "application" refers generally to a unit of executable software that implements a certain functionality or theme. The themes of applications vary broadly across any number of disciplines and functions (such as on-demand content management, e-commerce transactions, brokerage transactions, home entertainment, calculator etc.), and one application may have more than one theme. The unit of executable software generally runs in a predetermined environment; for example, the unit could comprise a downloadable Java Xlet™ that runs within the JavaTV™ environment.

As used herein, the terms "client device" and "end user device" include, but are not limited to, set-top boxes (e.g., DSTBs), personal computers (PCs), and minicomputers, whether desktop, laptop, or otherwise, and mobile devices such as handheld computers, PDAs, personal media devices (PMDs), and smartphones.

As used herein, the term "codec" refers to an video, audio, or other data coding and/or decoding algorithm, process or apparatus including, without limitation, those of the MPEG (e.g., MPEG-1, MPEG-2, MPEG-4, etc.), AVC/H.264, Real (RealVideo, etc.), AC-3 (audio), DiVX, XViDNiDX, Windows Media Video (e.g., WMV 7, 8, or 9), ATI Video codec, or VC-1 (SMPTE standard 421M) families.

As used herein, the term "computer program" or "software" is meant to include any sequence or human or machine cognizable steps which perform a function. Such program may be rendered in virtually any programming language or environment including, for example, C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ (including J2ME, Java Beans, etc.), Binary Runtime Environment (e.g., BREW), and the like.

As used herein, the term "consideration" refers without limitation to any payment, compensation, bargain, barter, release, option, or other arrangement wherein something of actual, perceived or potential future value (whether by an objective or subjective standard) is given, assigned, transferred or exchanged. For example, one form of consideration is a monetary payment. Another comprises an exchange of services. Yet another comprises release from an obligation or debt. Still another form comprises a subscription or installment plan. Yet a further form comprises providing a limited time option. Myriad other forms of consideration will be appreciated by those of ordinary skill given the present disclosure.

The terms "Customer Premises Equipment (CPE)" and "host device" refer to any type of electronic equipment located within a customer's or user's premises and connected to a network. The term "host device" refers generally to a terminal device that has access to digital television content via a satellite, cable, or terrestrial network. The host device functionality may be integrated into a digital television (DTV) set. The term "customer premises equipment" (CPE) includes such electronic equipment as set-top boxes (e.g., DSTBs), televisions, cable modems (CMs), embedded multimedia terminal adapters (eMTAs), whether stand-alone or integrated with other devices, Digital Video Recorders (DVR), gateway storage devices (Furnace), and ITV Personal Computers.

As used herein, the term "database" refers generally to one or more tangible or virtual data storage locations, which may or may not be physically co-located with each other or other system components.

As used herein, the term "display" means any type of device adapted to display information, including without limitation CRTs, LCDs, TFTs, plasma displays, LEDs, incandescent and fluorescent devices. Display devices may also include less dynamic devices such as, for example, printers, e-ink devices, and the like.

As used herein, the term "DVR" (digital video recorder) refers generally to any type or recording mechanism and/or software environment whereby content sent over a network can be recorded and selectively recalled. Such DVR may be dedicated in nature, or part of a non-dedicated or multi-function system.

As used herein, the term "DOCSIS" refers to any of the existing or planned variants of the Data Over Cable Services Interface Specification, including for example DOCSIS versions 1.0, 1.1, 2.0 and 3.0. DOCSIS (version 1.0) is a standard and protocol for internet access using a "digital" cable network. DOCSIS 1.1 is interoperable with DOCSIS 1.0, and has data rate and latency guarantees (VoIP), as well as improved security compared to DOCSIS 1.0. DOCSIS 2.0 is interoperable with 1.0 and 1.1, yet provides a wider upstream band (6.4 MHz), as well as new modulation formats including TDMA and CDMA. It also provides symmetric services (30 Mbps upstream).

As used herein, the term "headend" refers generally to a networked system controlled by an operator (e.g., an MSO) that distributes programming to MSO clientele using client devices. Such programming may include literally any information source/receiver including, inter alia, free-to-air TV channels, pay TV channels, interactive TV, and the Internet. DSTBs may literally take on any configuration, and can be retail devices meaning that consumers may or may not obtain their DSTBs from the MSO exclusively. Accordingly, it is anticipated that MSO networks may have client devices from multiple vendors, and these client devices will have widely varying hardware capabilities. Multiple regional headends may be in the same or different cities.

As used herein, the term "integrated circuit (IC)" refers to any type of device having any level of integration (including without limitation ULSI, VLSI, and LSI) and irrespective of process or base materials (including, without limitation Si, SiGe, CMOS and GaAs). ICs may include, for example, memory devices (e.g., DRAM, SRAM, DDRAM, EEPROM/Flash, ROM), digital processors, SoC devices, FPGAs, ASICs, ADCs, DACs, transceivers, memory controllers, and other devices, as well as any combinations thereof.

As used herein, the terms "Internet" and "internet" are used interchangeably to refer to inter-networks including, without limitation, the Internet.

As used herein, the term "memory" includes any type of integrated circuit or other storage device adapted for storing digital data including, without limitation, ROM. PROM, EEPROM, DRAM, SDRAM, DDR/2 SDRAM, EDO/FPMS, RLDRAM, SRAM, "flash" memory (e.g., NAND/NOR), and PSRAM.

As used herein, the terms "microprocessor" and "digital processor" are meant generally to include all types of digital processing devices including, without limitation, digital signal processors (DSPs), reduced instruction set computers (RISC), general-purpose (CISC) processors, microprocessors, gate arrays (e.g., FPGAs), PLDs, reconfigurable compute fabrics (RCFs), array processors, secure microprocessors, and application-specific integrated circuits (ASICs). Such digital processors may be contained on a single unitary IC die, or distributed across multiple components.

As used herein, the terms "MSO" or "multiple systems operator" refer to a cable, satellite, or terrestrial network provider having infrastructure required to deliver services including programming and data over those mediums.

As used herein, the terms "network" and "bearer network" refer generally to any type of telecommunications or data network including, without limitation, hybrid fiber coax (HFC) networks, satellite networks, telco networks, and data networks (including MANs, WANs, LANs, WLANs, internets, and intranets). Such networks or portions thereof may utilize any one or more different topologies (e.g., ring, bus, star, loop, etc.), transmission media (e.g., wired/RF cable, RF wireless, millimeter wave, optical, etc.) and/or communications or networking protocols (e.g., SONET, DOCSIS, IEEE Std. 802.3, ATM, X.25, Frame Relay, 3GPP, 3GPP2, WAP, SIP, UDP, FTP, RTP/RTCP, H.323, etc.).

As used herein, the terms "network agent" and "network entity" refers to any network entity (whether software, firmware, and/or hardware based) adapted to perform one or more specific purposes. For example, a network agent or entity may comprise a computer program running in server belonging to a network operator, which is in communication with one or more processes on a CPE or other device.

As used herein, the term "node" refers without limitation to any location, functional entity, or component within a network.

As used herein, the term "QAM" refers to modulation schemes used for sending signals over cable networks. Such modulation scheme might use any constellation level (e.g. QPSK, 16QAM, 64QAM, 256QAM, etc.) depending on details of a cable network. A QAM may also refer to a physical channel modulated according to said schemes. A QAM may also refer to the physical device that modulates an MPEG signal onto an RF carrier independent of the configured constellation level.

As used herein, the term "network interface" refers to any signal, data, or software interface with a component, network or process.

As used herein, the term "server" refers to any computerized component, system or entity regardless of form which is adapted to provide data, files, applications, content, or other services to one or more other devices or entities on a computer network.

As used herein, the terms "service", "content", and "stream" are sometimes used synonymously to refer to a sequence of packetized data that is provided in what a subscriber may perceive as a service. A "service" (or "content", or "stream") in the former, specialized sense may correspond to different types of services in the latter, non-technical sense. For example, a "service" in the specialized sense may correspond to, among others, video broadcast, audio-only broadcast, pay-per-view, or video-on-demand. The perceivable content provided on such a "service" may be live, pre-recorded, delimited in time, undelimited in time, or of other descriptions. In some cases, a "service" in the specialized sense may correspond to what a subscriber would perceive as a "channel" in traditional broadcast television.

As used herein, the term "service group" refers to either a group of service users (e.g. subscribers) or the resources shared by them in the form of entire cable RF signal, only the RF channels used to receive the service or otherwise treated as a single logical unit by the network for resource assignment.

As used herein, the term "storage device" refers to without limitation computer hard drives, DVR device, memory, RAID devices or arrays, optical media (e.g., CD-ROMs, Laserdiscs, Blu-Ray, etc.), or any other devices or media capable of storing content or other information.

As used herein, the term "user interface" refers to, without limitation, any visual, graphical, tactile, audible, sensory, or other means of providing information to and/or receiving information from a user or other entity.

As used herein, the term "wireless" means any wireless signal, data, communication, or other interface including without limitation WiFi (such as IEEE-Std. 802.11 or related standards including 802.11 a/b/g/n), Bluetooth, 3G, HSDPA/HSUPA, TDMA, CDMA (e.g., IS-95A, WCDMA, etc.), FHSS, DSSS, GSM, PAN/802.15, WiMAX (802.16), 802.20, narrowband/FDMA, OFDM, PCS/DCS, analog cellular, CDPD, satellite systems, millimeter wave or microwave systems, acoustic, and infrared (i.e., IrDA).

Overview

In one salient aspect, the present invention discloses methods and apparatus for identifying, creating and distributing audience or viewer qualities to an advertisement management system and/or an advertisement decision maker. The invention overcomes the disabilities of the previously discussed models (such as Nielsen) in that it provides viewership data in real-time (or near-real time), and offers the ability to monitor audience activities regarding, inter alia, broadcast, VOD, and DVR content.

This invention advantageously allows the content provider to create more targeted advertising campaigns through use of an algorithm that combines advertising placement opportunities with audience qualifiers (i.e., psychographic, geographic, demographic, characteristic, etc. classifications) to create an advertising "inventory" that can be more readily monetized. In different variants, the inventory can be based on historical and/or "real time" data, such that adverting placements can be conducted dynamically based on prevailing audience characteristics or constituency at that time.

The present invention further discloses methods and apparatus for managing such advertising inventory via a management system.

Subscriber privacy and anonymity is also advantageously maintained in one embodiment via, e.g., hashing or encrypting data relating to the CPE and/or subscriber, thus ensuring that stored data is not traceable to a specific user account. In alternative embodiments, only information that has been designated by a consumer or user is eligible for content collection and/or analysis. In this manner, subscriber privacy is effectively safeguarded, and user control of their private information (including for example preferences or user profile) is protected as well.

Exemplary network apparatus for implementing the various facets of the invention are also disclosed, as are business methodologies and an operation business "rules" engine (e.g., computer program).

Detailed Description Of Exemplary Embodiments

Exemplary embodiments of the audience classification apparatus and methods of the present invention are now described in detail. While these exemplary embodiments are described in the context of the aforementioned hybrid fiber coax (HFC) cable architecture having a multiple systems operator (MSO), digital networking capability, and plurality of client devices/CPE, the general principles and advantages of the invention may be extended to other types of networks and architectures, whether broadband, narrowband, wired or wireless, content or data, or otherwise. Hence, the following description is merely exemplary in nature. For example, the invention may be practiced over a fiber-to-the-home (FTTH) or fiber-to-the-curb (FTTC) system or over satellite or millimeter wave-based networks having two-way capabilities similar to today's digital cable HFC networks.

It will also be appreciated that while described generally in the context of a network providing service to a customer or consumer (i.e., residential) end user domain, the present invention may be readily adapted to other types of environments including, e.g., commercial/enterprise, and government/military applications. Myriad other applications are possible.

Also, while certain aspects are described primarily in the context of the well known IP or Internet Protocol (described in, inter alia, RFC 791 and 2460), it will be appreciated that the present invention may utilize other types of protocols (and in fact bearer networks to include other internets and intranets) to implement the described functionality.

Bearer Network Architecture—

FIG. 1 illustrates a typical content-based network configuration with which the apparatus and methods of the present invention may be used. The various components of the network 100 include (i) one or more data and application origination points 102; (ii) one or more content sources 103, (iii) one or more application distribution servers 104; (iv) one or more VoD servers 105, and (v) consumer premises equipment (CPE) 106. The distribution server(s) 104, VoD servers 105 and CPE(s) 106 are connected via a bearer (e.g., HFC) network 101. A simple architecture comprising one of each of the aforementioned components 102, 104, 105, 106 is shown in FIG. 1 for simplicity, although it will be recognized that comparable architectures with multiple origination points, distribution servers, VoD servers, and/or CPE devices (as well as different network topologies) may be utilized consistent with the invention. For example, the headend architecture of FIG. 1 a (described in greater detail below) may be used.

The data/application origination point 102 comprises any medium that allows data and/or applications (such as a VoD-based application, gaming application, or "Watch TV" application) to be transferred to a distribution server 104. This can include for example a third party data source, application vendor website, CD-ROM, external network interface, mass storage device (e.g., RAID system), etc. Such transference may be automatic, initiated upon the occurrence of one or more specified events (such as the receipt of a request packet or ACK), performed manually, or accomplished in any number of other modes readily recognized by those of ordinary skill.

The application distribution server 104 comprises a computer system where such applications can enter the network system. Distribution servers are well known in the networking arts, and accordingly not described further herein.

The VoD server 105 comprises a computer system where on-demand content can be received from one or more of the aforementioned data sources 102 and enter the network system. These servers may generate the content locally, or alternatively act as a gateway or intermediary from a distant source.

The CPE 106 includes any equipment in the "customers' premises" (or other locations, whether local or remote to the servers 104, 105) that can be accessed by a distribution server 104 or VOD server 105. Exemplary embodiments of a "converged" CPE (i.e., CD) of the invention are also described subsequently herein.

Figure 1A:
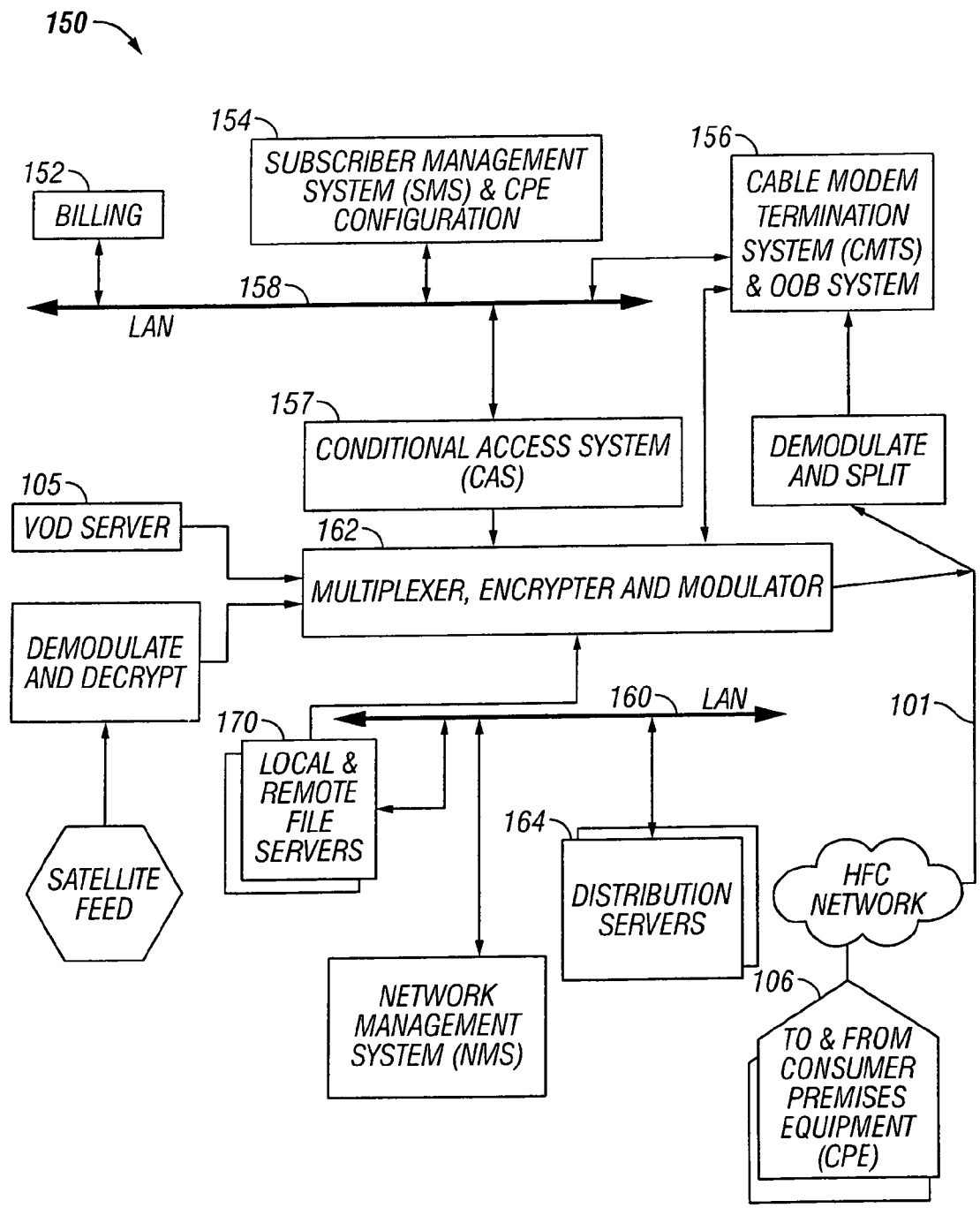
FIG. 1a is a functional block diagram illustrating one exemplary HFC cable network headend configuration useful with the present invention.

Referring now to FIG. 1a, one exemplary embodiment of headend architecture useful with the present invention is described. As shown in FIG. 1a, the headend architecture 150 comprises typical headend components and services including billing module 152, subscriber management system (SMS) and CPE configuration management module 154, cable-modem termination system (CMTS) and OOB system 156, as well as LAN(s) 158, 160 placing the various components in data communication with one another. It will be appreciated that while a bar or bus LAN topology is illustrated, any number of other arrangements as previously referenced (e.g., ring, star, etc.) may be used consistent with the invention. It will also be appreciated that the headend configuration depicted in FIG. 1a is high-level, conceptual architecture and that each MSO may have multiple headends deployed using custom architectures.

The architecture 150 of FIG. 1a further includes a multiplexer/encrypter/modulator (MEM) 162 coupled to the HFC network 101 adapted to "condition" content for transmission over the network. The distribution servers 164 are coupled to the LAN 160, which provides access to the MEM 162 and network 101 via one or more file servers 170. The VoD servers 105 are coupled to the LAN 160 as well, although other architectures may be employed (such as for example where the VoD servers are associated with a core switching device such as an 802.3z Gigabit Ethernet device). As previously described, information is carried across multiple channels. Thus, the headend must be adapted to acquire the information for the carried channels from various sources. Typically, the channels being delivered from the headend 150 to the CPE 106 ("downstream") are multiplexed together in the headend and sent to neighborhood hubs (FIG. 1b) via a variety of interposed network components.

It will also be recognized, however, that the multiplexing operation(s) need not necessarily occur at the headend 150 (e.g., in the aforementioned MEM 162). For example, in one variant, at least a portion of the multiplexing is conducted at a BSA switching node or hub (see discussion of FIG. 1c provided subsequently herein). As yet another alternative, a multi-location or multi-stage approach can be used, such as that described in U.S. patent application Ser. No. 11/048,334, entitled "Apparatus and Methods for Multi-Stage Multiplexing in a Network" incorporated herein by reference in its entirety, which discloses inter alia improved multiplexing apparatus and methods that allow such systems to dynamically compensate for content (e.g., advertisements, promotions, or other programs) that is inserted at a downstream network node such as a local hub, as well as "feed-back" and "feed-forward" mechanisms for transferring information between multiplexing stages.

Content (e.g., audio, video, data, applications, etc.) is provided in each downstream (in-band) channel associated with the relevant service group. To communicate with the headend or intermediary node (e.g., hub server), the CPE 106 may use the out-of-band (OOB) or DOCSIS channels and associated protocols. The OCAP 1.0, 2.0, 3.0 (and subsequent) specification provides for exemplary networking protocols both downstream and upstream, although the invention is in no way limited to these approaches.

It will also be recognized that the multiple servers (broadcast, VoD, or otherwise) can be used, and disposed at two or more different locations if desired, such as being part of different server "farms". These multiple servers can be used to feed one service group, or alternatively different service groups. In a simple architecture, a single server is used to feed one or more service groups. In another variant, multiple servers located at the same location are used to feed one or more service groups. In yet another variant, multiple servers disposed at different location are used to feed one or more service groups.

Figure 1B:
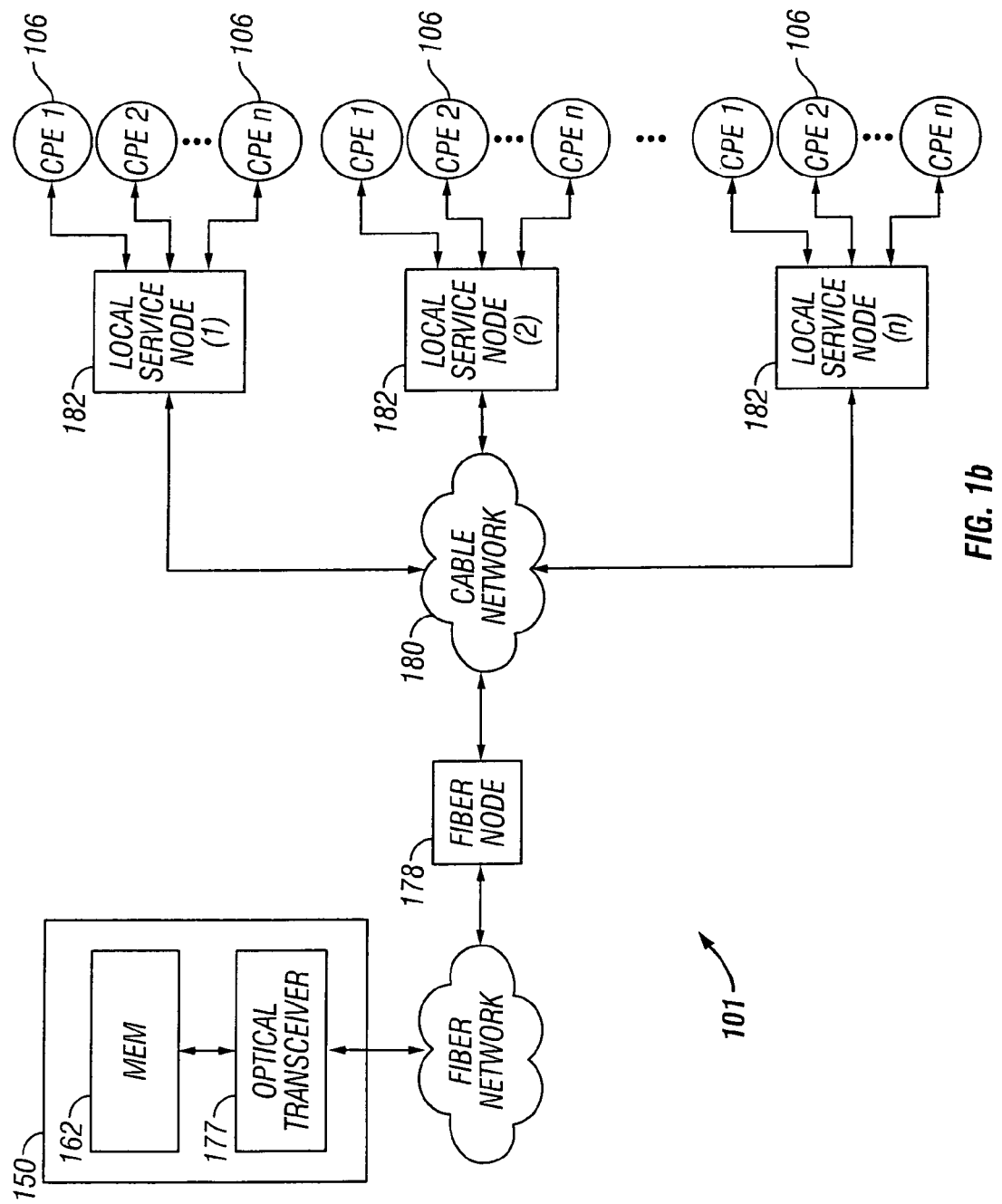
FIG. 1b is a functional block diagram illustrating one exemplary local service node configuration useful with the present invention.
Figure 1C:
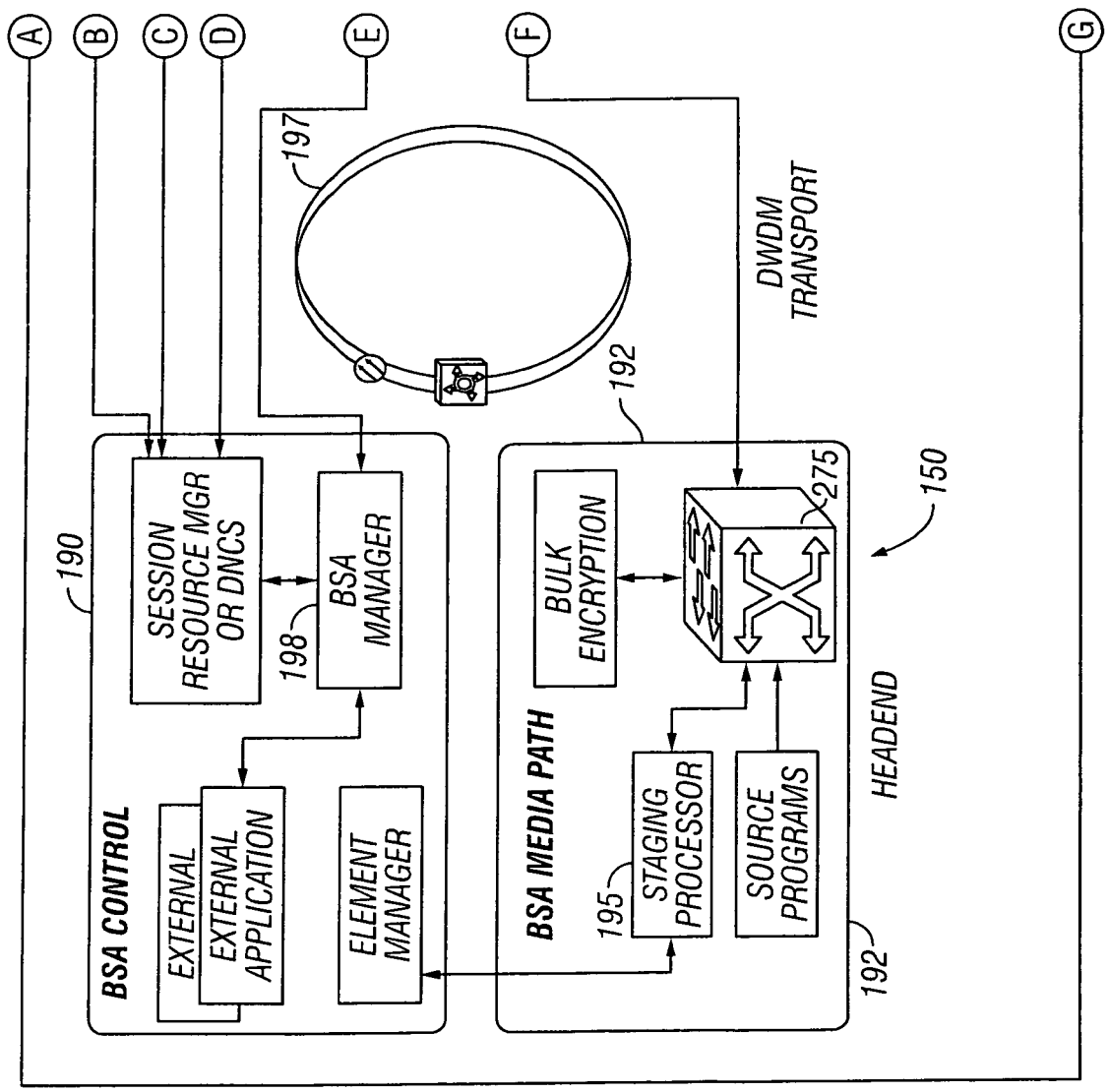
FIG. 1c is a functional block diagram illustrating one exemplary broadcast switched architecture (BSA) network useful with the present invention.
Figure 1C:
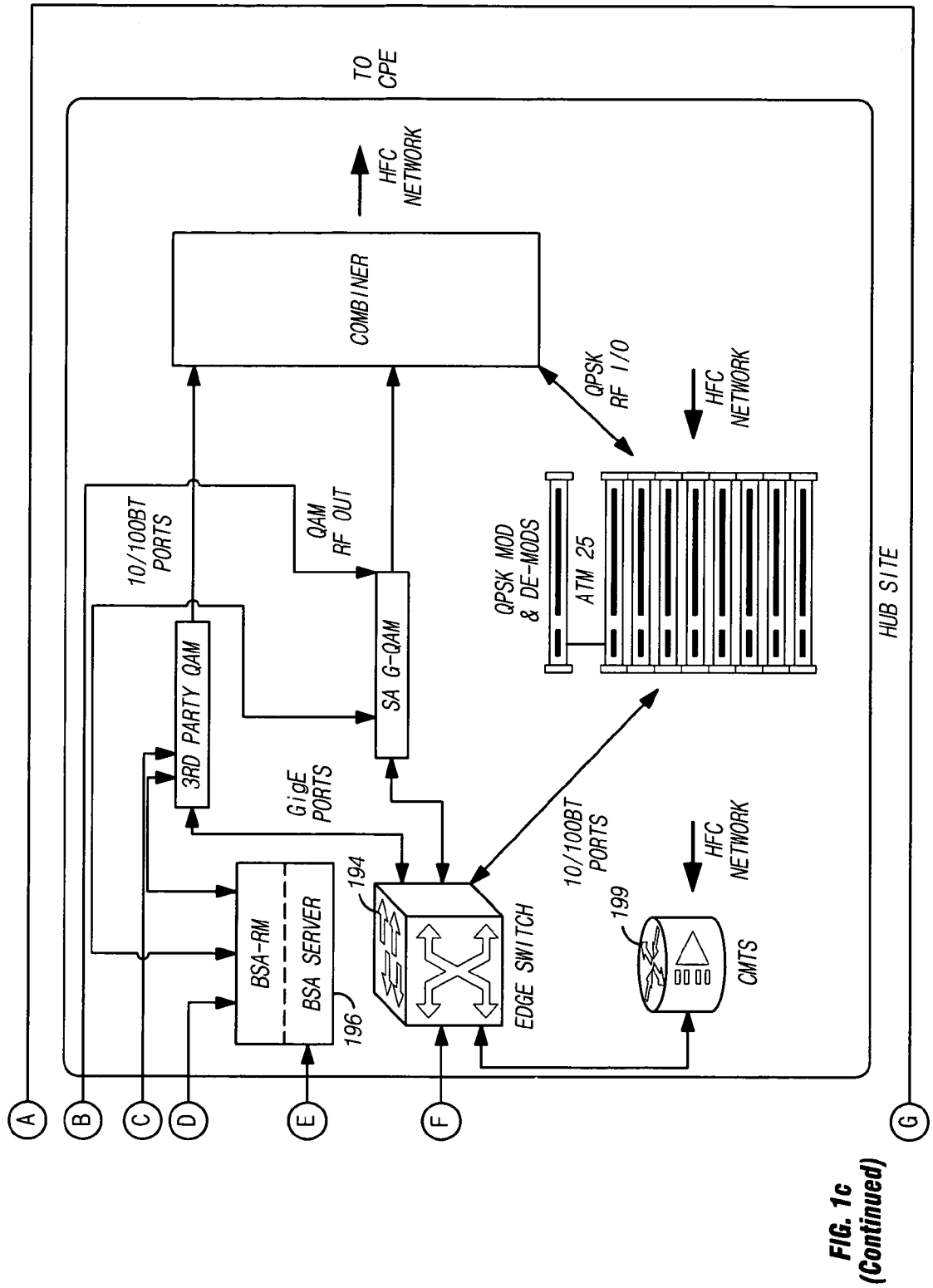

As shown in FIG. 1b, the network 101 of FIGS. 1 and 1a comprises a fiber/coax arrangement wherein the output of the MEM 162 of FIG. 1a is transferred to the optical domain (such as via an optical transceiver 177 at the headend or further downstream). The optical domain signals are then distributed to a fiber node 178, which further distributes the signals over a distribution network 180 to a plurality of local servicing nodes 182. This provides an effective 1:N expansion of the network at the local service end.

"Switched" Networks—

FIG. 1c illustrates an exemplary "switched" network architecture also useful with the present invention. While a so-called "broadcast switched architecture" or BSA network is illustrated in this exemplary embodiment, it will be recognized that the present invention is in no way limited to such architectures.

Switching architectures allow improved efficiency of bandwidth use for ordinary digital broadcast programs. Ideally, the subscriber will be unaware of any difference between programs delivered using a switched network and ordinary streaming broadcast delivery.

FIG. 1c shows the implementation details of one exemplary embodiment of this broadcast switched network architecture. Specifically, the headend 150 contains switched broadcast control and media path functions 190, 192; these element cooperating to control and feed, respectively, downstream or edge switching devices 194 at the hub site which are used to selectively switch broadcast streams to various service groups. A BSA server 196 is also typically disposed at the hub site, and implements functions related to switching and bandwidth conservation (in conjunction with a management entity 198 disposed at the headend). An optical transport ring 197 is utilized to distribute the dense wave-division multiplexed (DWDM) optical signals to each hub in an efficient fashion.

Co-owned and co-pending U.S. patent application Ser. No. 09/956,688 filed Sep. 20, 2001 and entitled "Technique for Effectively Providing Program Material in a Cable Television System", incorporated herein by reference in its entirety, describes one exemplary broadcast switched digital architecture useful with the present invention, although it will be recognized by those of ordinary skill that other approaches and architectures may be substituted.

In addition to "broadcast" content (e.g., video programming), the systems of FIGS. 1a-1c can also deliver Internet data services using the Internet protocol (IP), although other protocols and transport mechanisms of the type well known in the digital communication art may be substituted. One exemplary delivery paradigm comprises delivering MPEG-based video content (e.g., "IPTV" or the like), with the video transported to user PCs (or IP-based STBs) over the aforementioned DOCSIS channels comprising MPEG (or other video codec such as H.264 or AVC) over IP over MPEG. That is, the higher layer MPEG- or other encoded content is encapsulated using an IP protocol, which then utilizes an MPEG packetization of the type well known in the art for delivery over the RF channels. In this fashion, a parallel delivery mode to the normal broadcast delivery exists; i.e., delivery of video content both over traditional downstream QAMs to the tuner of the user's STB or other receiver device for viewing on the television, and also as packetized IP data over the DOCSIS QAMs to the user's PC or other IP-enabled device via the user's cable or other modem.

Referring again to FIG. 1c, the IP packets associated with Internet services are received by edge switch 194, and forwarded to the cable modem termination system (CMTS) 199. The CMTS examines the packets, and forwards packets intended for the local network to the edge switch 194. Other packets are discarded or routed to another component.

The edge switch 194 forwards the packets receive from the CMTS 199 to the QAM modulator 189, which transmits the packets on one or more physical (QAM-modulated RF) channels to the CPEs (or CD). The IP packets are typically transmitted on RF channels that are different than the RF channels used for the broadcast video and audio programming, although this is not a requirement. The CPE 106 are each configured to monitor the particular assigned RF channel (such as via a port or socket ID/address, or other such mechanism) for IP packets intended for the subscriber premises/address that they serve.

Audience Classification System—

Figure 2:
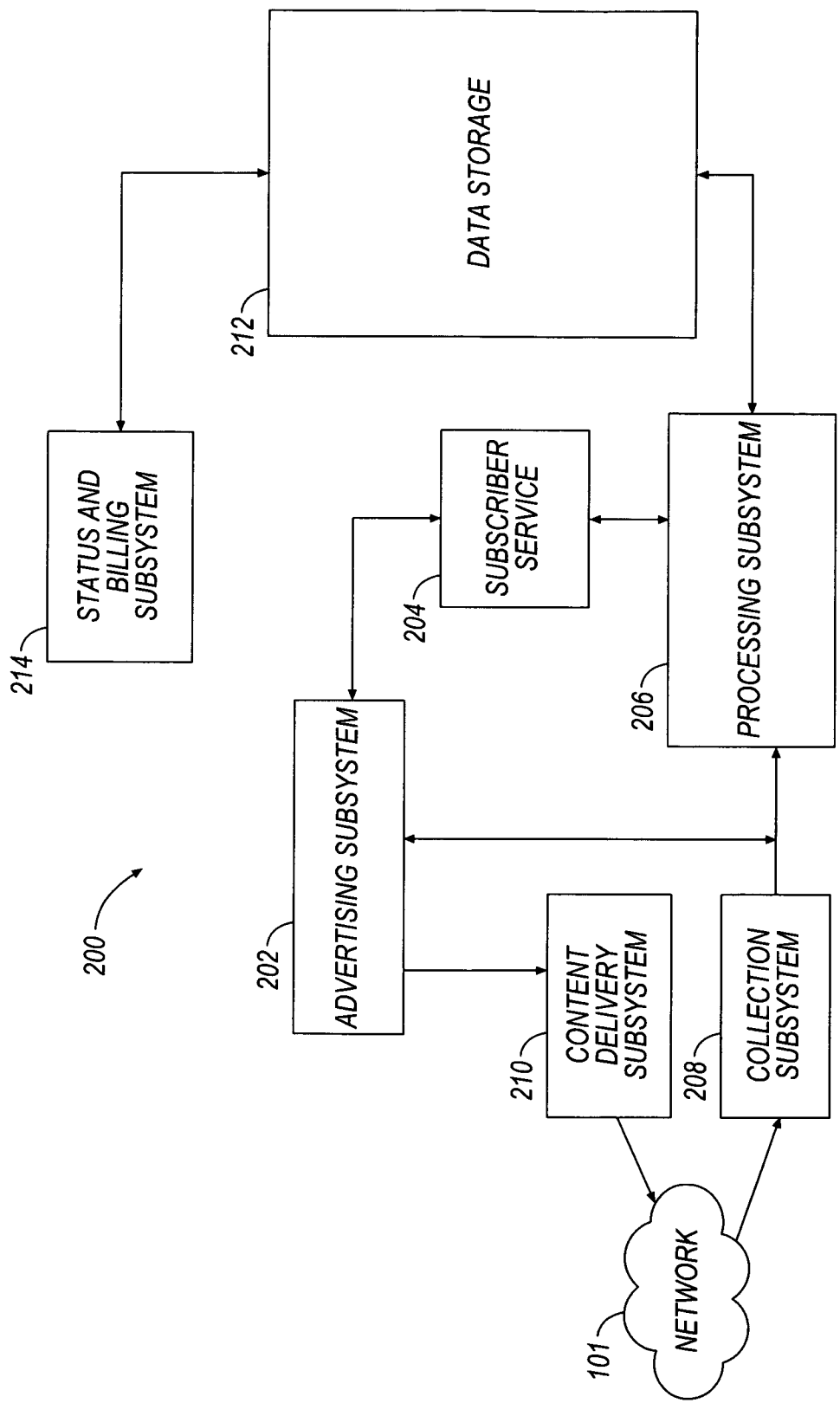
FIG. 2 is a high-level block diagram illustrating an embodiment of an audience classification system according to the present invention.

Referring now to FIG. 2, one embodiment of the network architecture specifically implementing the audience classification and targeted advertisement/promotional delivery functions of the invention is shown and described. The system 200 of FIG. 2 is in the present embodiment disposed substantially at one or more cable or satellite network headends or distribution facilities, although it will be recognized that this is in no way a requirement, and in fact the components may be distributed among various different physical locations (and connected via network for example) as desired. Moreover, different cable or satellite system headends may share components between them, and/or have multiple ones of components installed for e.g., redundancy/failover protection, different tasking or service, etc.

As shown in FIG. 2, the system 200 comprises an advertising subsystem 202, subscriber information service 204, processing subsystem 206, data collection subsystem 208, and content delivery subsystem 210, in operative communication as shown. A data storage subsystem 212 and status and billing subsystem 214 are also in communication with the processing subsystem 206. The content delivery subsystem 210 and data collection subsystem 208 are in communication with the HFC distribution network 101 to deliver content and receive data from user equipment (e.g., CPE 106) such as via an out-of-band upstream RF channel, although it will be appreciated that other approaches may be used, including for example delivery via an upstream DOCSIS channel, or even a whole separate transport such as a wireless or other IP network (not shown).

Figure 2A:
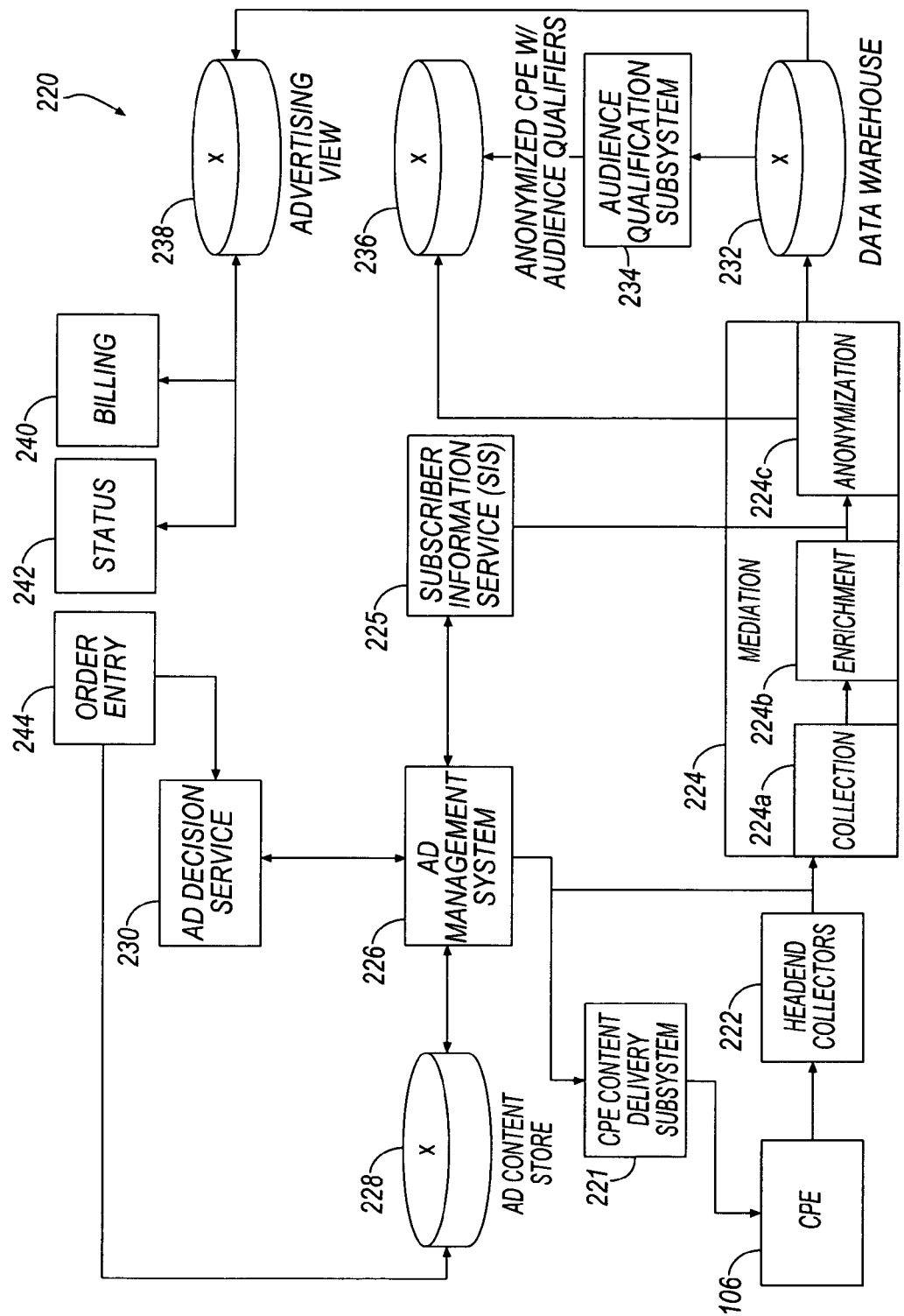
FIG. 2a is a functional block diagram illustrating an exemplary cable network implementation of the audience classification system of FIG. 2.

The operation and function of the foregoing subsystems and components is illustrated in detail with respect to one exemplary implementation (see discussion of FIG. 2a below), although it will be appreciated that the embodiment of FIG. 2a is merely one possible architecture for implementing the system 200 of FIG. 2. Moreover, various of the subsystems and components shown in FIG. 2 can be combined with others, or functions performed thereby distributed across different functional (e.g., hardware or software) entities already within the content delivery network.

Referring now to FIG. 2a, an exemplary implementation of the audience classification system according to FIG. 2 described above is given. The system 220 enables data regarding an audience to be collected and information to be derived therefrom in order to categorize or group an audience. The categories and/or groups may be used for, inter alia, generating an inventory as discussed subsequently herein and/or targeting advertisements as discussed in co-owned, co-pending U.S. patent application Ser. No. 12/503,710 entitled "METHODS AND APPARATUS FOR TARGETED SECONDARY CONTENT INSERTION" filed concurrently herewith and incorporated herein by reference in its entirety.

As illustrated, the audience classification system 220 of FIG. 2a generally comprises a content delivery subsystem 221 adapted to provide content to the CPE 106. The content delivery subsystem 221 may, in one embodiment, comprise a local node 182 such as that described above with respect to FIG. 1b. Alternatively, the content delivery subsystem 221 may comprise an entity separate from, yet in communication with the above described content-transmitting entities. The content delivery subsystem 221 is adapted to delivery "primary" and "secondary" content to a CPE 106. As described above, primary content (e.g., movies, broadcast programs, etc.) is delivered to the CPE 106 from various content sources 103. Secondary content (such as advertising or promotional content), in the illustrated embodiment, is originated from an advertisement management system (ADM) 226.

The ADM 226 selects individual ones of a plurality of secondary content for delivery to individual ones of the CPE 106 from a secondary content store 228. The ADM 228 may, in one embodiment, be adapted to comply with the requirements set forth in the Society of Cable Telecommunications Engineers SCTE 130-1 and SCTE 130-3 Digital Program Insertion—Advertising Systems Interfaces standards, which are incorporated herein by reference in their entirety. Advertising content is placed on the content store 228 by a source of the advertisement (not shown). In one embodiment, the ADM 226 is in communication with an Advertisement Decision Service 230 which determines individual ones of the plurality of secondary content from the content store 228 to deliver to the CPE 106 (via the content delivery subsystem 221) based in part on data collected from a headend collecting entity 222.

It is noted that although only one headend collector 222 is depicted in FIG. 2a, the audience classification system 220 may comprise, in one embodiment, several headend collectors 222 belonging to various MSOs. Alternatively, the headend collector 222 may comprise one or several headend collectors 222 of the same MSO.

As illustrated in FIG. 2a, the headend collecting entity 222 receives information from the CPE 106 regarding actions taken thereon with respect to content (whether secondary or primary). For example, the headend collecting entity 222 may receive information about individual user activities including, inter alia, tuning events (such as viewing a broadcast program or purchasing a VOD program), manipulation events or "trick mode" operations (such as fast forwarding, rewinding, etc.), recording events (e.g., DVR or nPVR commands), events which relate to changes in the system's configuration (for example, changes to the program channel map or changes to the services a particular CPE 106 receives), and/or "heartbeat" events such as those indicating whether a particular CPE is powered up or otherwise active/functional.

The headend collecting entity 222 may be further adapted to collect information regarding geographic location, demographic and/or psychographic information, system capabilities, the size of the audience for any particular program, etc. of the CPE 106 in communication therewith. Although only one CPE 106 is illustrated, it will be appreciated that the headend collecting entity 222 may be adapted to receive and process information from a plurality of CPE 106. Certain information regarding the CPE 106 may further be collected from the Electronic Programming Guide (EPG), web portals, cell phone usage, Customer Relationship Management Systems (CRM), billing systems, census data, other advertising networks, and other third party sources (such as e.g., Canoe Ventures, etc.).

In another embodiment, the headend collecting entity 222 may also receive metadata regarding secondary content transmitted to the CPE 106. For example, the ADM 226 may transmit secondary content to the content delivery subsystem 221 (discussed above) and simultaneously send metadata regarding the secondary content to the headend collecting entity 222. Alternatively, the headend collecting entity 222 may be provided with metadata regarding all of the secondary content stored on the content store 228 before the secondary content is transmitted to the CPE 106.

In another embodiment, a content information service (CIS), subscriber information service (SIS) and/or placement opportunity information service (POIS) communicate with the ADM 226 to provide metadata and other information thereto. The CIS is an interface which describes a logical service, it may be run on any entity managing metadata or on an entity in communication with a second entity containing metadata describing the content. The CIS sources metadata to consumers (via the ADM and ADS). The CIS does not define how to move the content around, however a separate CIS implementation may be given to provide such functionality.

The headend collecting entity 222 translates the metadata to a content record describing the content to which it relates. Generally speaking, "metadata" comprises extra data not typically found in typical content (or at least not visible to the users of the network), such as for example that rendered in an XML or other such format. For each component of the content (e.g., video/audio), one or more metadata files are associated that specify the relevant search terms or primitives for that content. This metadata can be provided with the content from its source or provider (e.g., a network studio or station or the like), or alternatively added by the MSO. Alternatively, portions of the metadata can be added by multiple entities, and/or editing of another entity's metadata performed. Various permutations and mechanisms for generating, adding and editing metadata will be recognized by those of ordinary skill, and hence are not described in detail herein.

It is also appreciated that in yet another embodiment, the headend collecting entity 222 may be adapted to further receive metadata regarding primary content transmitted to the CPE via the content delivery subsystem 221 or other content providing entity (such as those disclosed above with respect to FIGS. 1a-1c). Such metadata may be useful for a variety of reasons including for example obtaining a description of a particular primary content element so that appropriate advertising can be matched thereto; see e.g., co-owned and co-pending U.S. patent application Ser. No. 12/284,757 filed Sep. 24, 2008 entitled "Methods and Apparatus for User-Based Targeted Content Delivery" which is incorporated herein by reference in its entirety, for one exemplary use of such primary metadata in connection with targeted advertising.

The headend collecting entity 222 passes the collected customer information (e.g., user preferences, activity, demographics, etc.) and metadata regarding content (primary and/or secondary) to the data collection portion 224a of the processing (e.g., mediation) entity 224. The mediation entity 224 is adapted to receive and process the collected information from disparate sources (such as e.g., tuning data from the SDV server, VOD, DVR or click stream data from the STB, etc.). In some cases the data may be collected in real-time or near real-time. In one embodiment, the mediation entity 224 synthesizes the information at an enrichment portion 224b; such synthesis may include e.g., identification of one or more patterns of interest (PI) in the aggregate data collection. This identification may be accomplished via any one of the plurality of methods for mining and examining data sets known in the arts. The PI's are theoretically arbitrary, and depend on business needs or research discovery.

A salient feature of a PI is the ability to reproduce the pattern, and in turn generate basic questions to be asked and answered of that PI (e.g., given a PI of "has internet and video", one would want to know given perhaps some other constraints, "how many of those are present?" or given this subscriber or set of subscribers (audience) is there a "match"). In other words, PI's are mechanisms for identifying from a large population of CPE reporting data on a near real-time (or real-time) basis, a relatively small subset of the CPE which exhibit a particular desired behavior. For example, PI's may indicate from among all of the CPE in a market only the ones which are doing or have performed an action to receive a specific commercial; the particular action performed which caused delivery of the commercial in this example is the PI. A PI may be expressed as an arbitrarily complex Boolean Expression against the data collected. Suppose for example set-top tuning data is being collected, a possible PI may be those households for which one STB was tuned to Fox News™ in prime time for at least one hour per day over a week long period. The PI may then be applied to the entire population of STBs, thereby extracting only those STBs that, over the last week have been Tuned to Fox News for at least one hour per day. The identified STBs are then associated to the household to which they belong in an anonymous manner.

In another example, suppose a baby food advertiser seeks to advertise in households where expecting mothers are viewing. In this instance, a relevant PI may be those (anonymous) households with STBs that had relatively less tune-away events during commercials for pregnancy tests.

The patterns of interest (PI's) may relate to only a few of the plurality of CPE 106 providing data to the headend collectors 222 and mediation entity 224. However, if a predetermined number of CPE 106 share a given pattern of interest, that pattern of interest may then be expressed as an audience qualifier. An audience qualifier is a Boolean expression (e.g., has HSD, etc.) with an arbitrarily complex set of Boolean expressions joined together. In theory an audience qualifier may be used to express literally any PI. In other words, the system is triggered to understand that there is an "audience" sharing the pattern of interest. As will be discussed in greater detail below, the audience qualifier characterized by the reproducible pattern of interest is then further categorized into one or more classifications based on the collected data. Exemplary classifications include but are not limited to psychographic variables (e.g., "prefers watching mysteries", "likely to purchase a laptop", etc.), geographic location (e.g., "within the 80027 zip code", "currently driving down 1-70", etc.), demographic makeup (e.g., "age 30-35", "income $50K-$70K", etc.), or other characteristic (e.g., Claritas PRIZM code, other market segmenting service code, etc.).

Classified audience qualifiers can therefore be traced to patterns of interest, and help determine the "reach" of the audience (e.g., which and how many CPE have the given classification). For example, one pattern of interest may be watching a particular program every Wednesday night; this type of pattern of interest may be determined from the metadata regarding primary content and user activity at the CPE 106. If the data collected indicates that a predetermined threshold of CPE 106 are tuning to that same program every Wednesday, watching the program may then be considered an audience qualifier. The enrichment portion 224b of the mediation entity 224 may then classify the audience qualifier by e.g., age, in order to determine for example that the vast majority of people watching the program every Wednesday night are within the 18-25 year old age range.

Once audience qualifiers have been created and characterized, a service such as the Subscriber Information Service (SIS) 225 described by the Society of Cable Telecommunications Engineers in SCTE 130-1 and SCTE 130-6 Digital Program Insertion—Advertising Systems Interfaces standards referenced above (see inter alia, Part 6), may be used to distribute the audience qualifiers to other entities such as the ADM 226, advertisement decision service (ADS) 230.

The enrichment portion 224b of the mediation entity 224 may be further adapted to "enrich" collected audience data by the insertion of associated data elements. In other words, processing is performed and/or additional data is added so as to enhance or increase the value of the data to one or more user or downstream entities. For instance, in one embodiment, event information is coupled to user specific information, thus the enrichment portion 224b correlates the CPE's 106 native MAC address to the data. Such data can include information regarding a CPE's 106 particular configuration including, inter alia, the specific services a CPE 106 is associated with, what a CPE 106 is authorized to tune to, etc. Alternatively, enrichment may take the form of pre-processing of data or converting it to a desired format or form. For instance, "fuzzy logic" variables (e.g., "high", "medium", "low") can be converted to a linear or other reference context (e.g., "10-7.5", "7.4-3.5", and "3.4-0", respectively), or vice-versa. As another example, search terms or primitives can be generated or converted from other data, so as to be more useful in a search engine. Myriad other types of "enrichment" will be recognized by those of ordinary skill given the present disclosure, the foregoing being merely illustrative of the broader principles.

The audience qualifiers and other data are then optionally anonymized at the anonymization portion 224c of the mediation entity 224. Data may be anonymized by inter alia, the use of a cryptographic hash. In one embodiment, the techniques for providing anonymity utilizing a cryptographic hash described in U.S. patent application Ser. No. 11/186,452 filed Jul. 20, 2005 and entitled "Method and Apparatus for Boundary-Based Network Operation", which is incorporated herein by reference in its entirety, may be utilized in conjunction with the present invention. As disclosed therein, the identity of a CPE is anonymized by using a cryptographic hash coupled with an optional "opaque" variable which carries information relating to the CPE of the hash with which it is associated. The hash and opaque variable frustrate de-encryption or reverse-engineering of the individual subscriber's identity or specific location. Alternative methods of providing anonymization may also be utilized consistent with the present invention.

As illustrated in FIG. 2, the anonymized data is then passed to at least one of a plurality of data warehouses 232, 236, 238. The data warehouses 232, 236, 238 are adapted to store data and retrieve stored data for requesting entities. The data warehouses 232, 236, 238 may, in one embodiment, be adapted to utilize one or more computer applications to perform Nielsen-like analysis, and report results to requesting entities (not shown). In another embodiment, the warehouses 232, 236, 238 are in communication with one or more raw storage entities (not shown). At the raw storage, raw records (i.e., unanalyzed data) are maintained for a pre-set period of time. In one example, the raw storage entities may be adapted to maintain raw records for 12 months in a "rolling" fashion, such that once data has aged 12 months it is dropped from the storage and newer data takes its place. Exemplary raw storage entities may comprise a hybrid of storage area network (SAN), virtual tape library (VTL) and offline tape storage, or RAID array; however, other configurations having alternate components may be used as well.

In another embodiment, each of the headend collection entities 222 may comprise an individual mini-warehouse (not shown) for storage or analysis of "local" audience research data; e.g., that pertinent to the subscriber base associated with that entity 222. According to this embodiment, after a certain period of time, at a particular time of the day, or upon warehouse 232, 236, 238 request, data in the mini-warehouse will be sent to one of the "global" warehouses 232, 236, 238, thus reducing traffic to and from the warehouse 232, 236, 238. The data warehouses 232, 236, 238 to which the anonymized data may be sent is in communication with an audience qualification subsystem 234.

The audience qualification subsystem 234 takes the entire population of STBs and applies audience qualifiers which describe arbitrary PIs, or in some cases PIs which are known to be important to a particular advertiser(s). A pool of actual viewers associated with the PI can then be determined and marketed to advertisers. The audience qualification subsystem 234 rather than utilizing real-time advertisement insertion, enables "mining" of the data warehouse to find appropriate audience qualifiers. In other words, the audience qualification subsystem 234 enables an operator to know that a particular PI (and the audience qualifiers that describe it) has a meaningful population among a group of CPE. This information may then be used to build an advertising campaign.

The data warehouses 232, 236, 238 may further be in communication with a status entity 222 adapted to utilize the anonymized data to extract information regarding the status of the secondary content (i.e., time of day, frequency, etc. with which an advertisement has been inserted into primary content) and a billing entity 240 adapted to generate a bill for the insertion of the advertisement based on the determined status, the bill then being delivered to an entity associated with the advertisements. In one embodiment this occurs as described in co-owned, co-pending U.S. patent application Ser. No. 12/503,772 entitled "METHODS AND APPARATUS FOR CLASSIFYING AN AUDIENCE IN A CONTENT-BASED NETWORK" filed concurrently herewith and incorporated herein by reference in its entirety.

In one embodiment, a profile is used to describe a portion of an audience which may be translated to a series of audience qualifiers (e.g., "young wealthy mothers"). Salespersons are able to sell advertisements against profiles, for example, the salesperson may assert to a Ford dealer that its new product targeted to young women may be directly advertised to 200,000 "young wealthy mothers" in Charlotte. The profiled translates to a specific set of audience qualifiers which are then used to identify placement opportunities.

Each CPE for which a particular placement opportunity is valid is then, in real-time, connected to the ADM 226. The ADM 226 uses information regarding what each CPE is tuned to in order to determine which CPE are viewing a channel when an insertion opportunity occurs on that channel. The ADM 226 may then "average" the audience qualifiers associated with each CPE (provided by the SIS 225) in order to determine a "best fit" profile from among all of the profiles. The list of AQs associated with the "best fit" profile are used in a query to the ADS to get an advertisement.

If a salesperson has sold more than one advertiser on the same profile, the advertisements may be weighted so as to correlate with the "best fit" profile. In one embodiment, when the ADS gets a request for an advertisement against the AQs associated with the profile, the ADS must decide from among all of the advertisers who purchased in the profile.

In a further embodiment, each sale will have a "flight window" indicating the time it should be viewed, an "audience guarantee" indicating the number of viewers meeting the profile that will view the advertisement and/or a "potential for revenue". These factors may be used in determining which advertiser will be apportioned the spot. One or more of these factors may be weighted as necessary to arrive at a "best fit" solution.

Further, the data warehouses 232, 236, 238 may share anonymized or otherwise pre-processed version of the audience data, and/or the raw analyzed data itself, with other requesting entities (such as those entities which in the past have relied on Nielsen rating data). The aforementioned communication may be transport agnostic and may utilize for example web services, SOAP/XML/HTTP/TCPIP communications. The message format may be an XML structure.

The POIS, which is in communication with the ADM, may be utilized to identify placement opportunities. The POIS is an interface which, when implemented, provides the ability for describing a placement opportunity. Identifying or triggering a placement opportunity may be session setup based (i.e., based on user events), or may be signaled with OOB communication techniques such as SCTE 35, DVB-SAD, and/or DSM-CC. A signal may be used to mark a point in the stream (or in the user-initiated case, an event). The POIS supplies "policy" information surrounding what the opportunity looks like (30 seconds and 60 seconds) and, inter alia, ownership information. The ADM is then able to detect the events and apply the policy offered from the POIS, and obtain a decision from the ADS.

The order entry 242 and status module 244 provide a real-time ability to track effectiveness of a campaign. Tracking may include utilizing information regarding the anticipated audience (e.g., what a salesperson determined the audience to be). As the ADM 226 works with the SIS 225 to play the spots necessary to fill the order information is collected (via the mediation layer). Over a given period of time, a salesperson can examine the status of the campaign and determine how close the actual audience was to the anticipated audience. In other words, the status module 244 enables mining of the data warehouse to find audience qualifiers which are useful.

The audience qualification subsystem 234 is able to apply audience qualifiers across a population to generate arbitrary patterns of interest having a meaningful population and in which an advertiser may be interested.

Audience Qualifier Classification—

As discussed previously, one aspect of the present invention regards generation of a series of common characteristics among an audience, i.e., audience qualifiers, which are then classified for future use. Based at least in part on the audience qualifiers, individual ones of the plurality of secondary content stored at the secondary content store 228 may be selected to be transmitted to the audience as described in previously referenced U.S. patent application Ser. No. 12/503,710 entitled "METHODS AND APPARATUS FOR TARGETED SECONDARY CONTENT INSERTION", which is previously incorporated herein by reference in its entirety.

Figure 3:
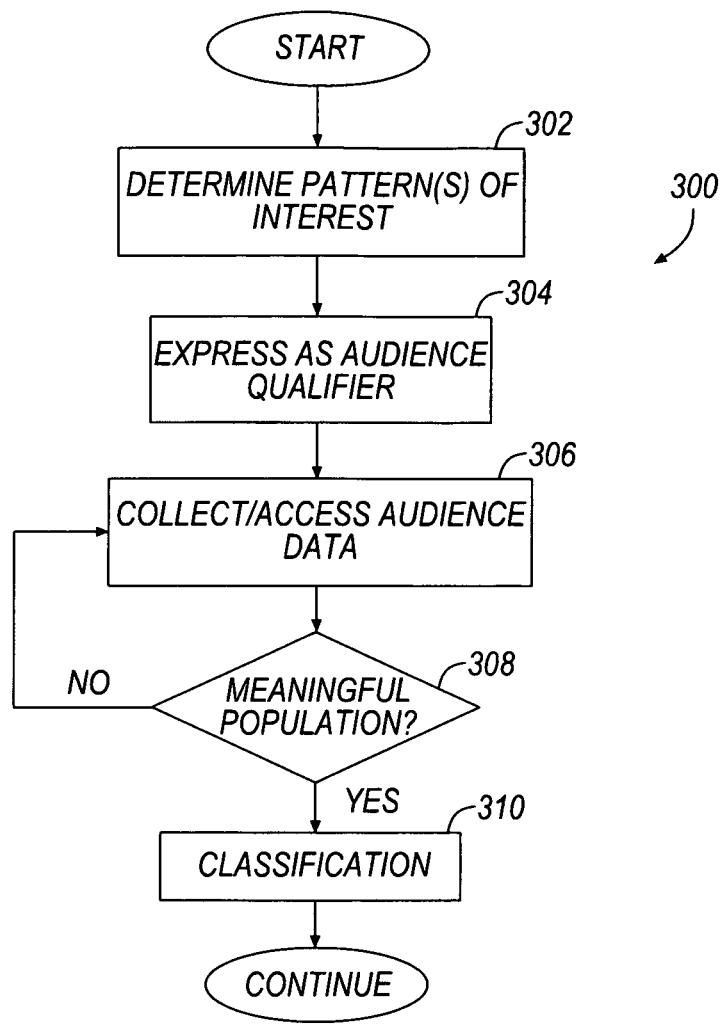
FIG. 3 is a flow diagram illustrating an exemplary method of generation and classification of audience qualifiers according to the present invention.

In one embodiment, audience qualifiers are generated and classified according to the method 300 illustrated in FIG. 3. As illustrated, per step 302, one or more patterns of interest (PI) are first determined. The PI are audience characteristics which are chosen by an operator of the system as being useful or potentially useful in e.g., selecting subsequent content to provide to the CPE 106. For example, a particular retailer may be interested in the CPE 106 tuning to a particular program, selecting a particular VoD or PPV content element for delivery, or searching the Internet for particular content, thus this event may be considered a "pattern of interest". At step 304, the PIs are expressed as audience qualifiers. It is appreciated that the PI (and audience qualifiers) may be arbitrarily chosen, or chosen based on predetermined factors or features. The PI and audience qualifiers are Boolean expressions for characterizing data.

Next, at step 306, data is collected regarding an audience. In one variant, the data may be collected by a headend collector 222 from each of a plurality of CPE 106 in communication therewith. The data collected may comprise for example a size of an audience of a particular program. The data may further comprise information regarding tuning events at individual CPE 106. For example, the headend collector 222 may collect information indicative that a particular CPE 106 tuned to a program on Channel X from 8:52 pm-9:03 pm, or ordered on-demand or PPV content, etc. The data may further comprise manipulation or trick mode usage events; e.g., that the user fast-forwarded, rewound, paused, etc. the program over a given interval. For instance, LSCP (lightweight stream control protocol) or other commands sent to the headend by a particular MAC address may be recorded. Still further, data may be collected regarding the capabilities of each of the CPE 106, such as, e.g., whether the CPE 106 have DVR capabilities, whether the CPE 106 is capable of retrieving data via internet protocol (IP), etc.

Data may also be obtained passively regarding the audience at a given time. For instance, one embodiment of the method 300 of FIG. 3 determined which CPE 106 are currently active on the network (such as via a "heartbeat" indication from hardware or software on the CPE, tuning activity every so often, etc.), and via the device MAC address or hashed variable, which particular subscriber account is associated with that CPE. Stored data (such as user demographic/psychographic data obtained at time of sign-up, or gleaned from subscriber behavior over time) can then be accessed and utilized as a basis of qualification. For example, a given subscriber with a CPE having a certain MAC address may have indicated in their subscriber profile that they are age 40, make $100,000 per year, live in zip code 92127, have a family of four, enjoy golf, etc. This stored data can be accessed and analyzed in light of many other CPE active on the network at that same point to identify commonalities or patterns.

Figure 2B:
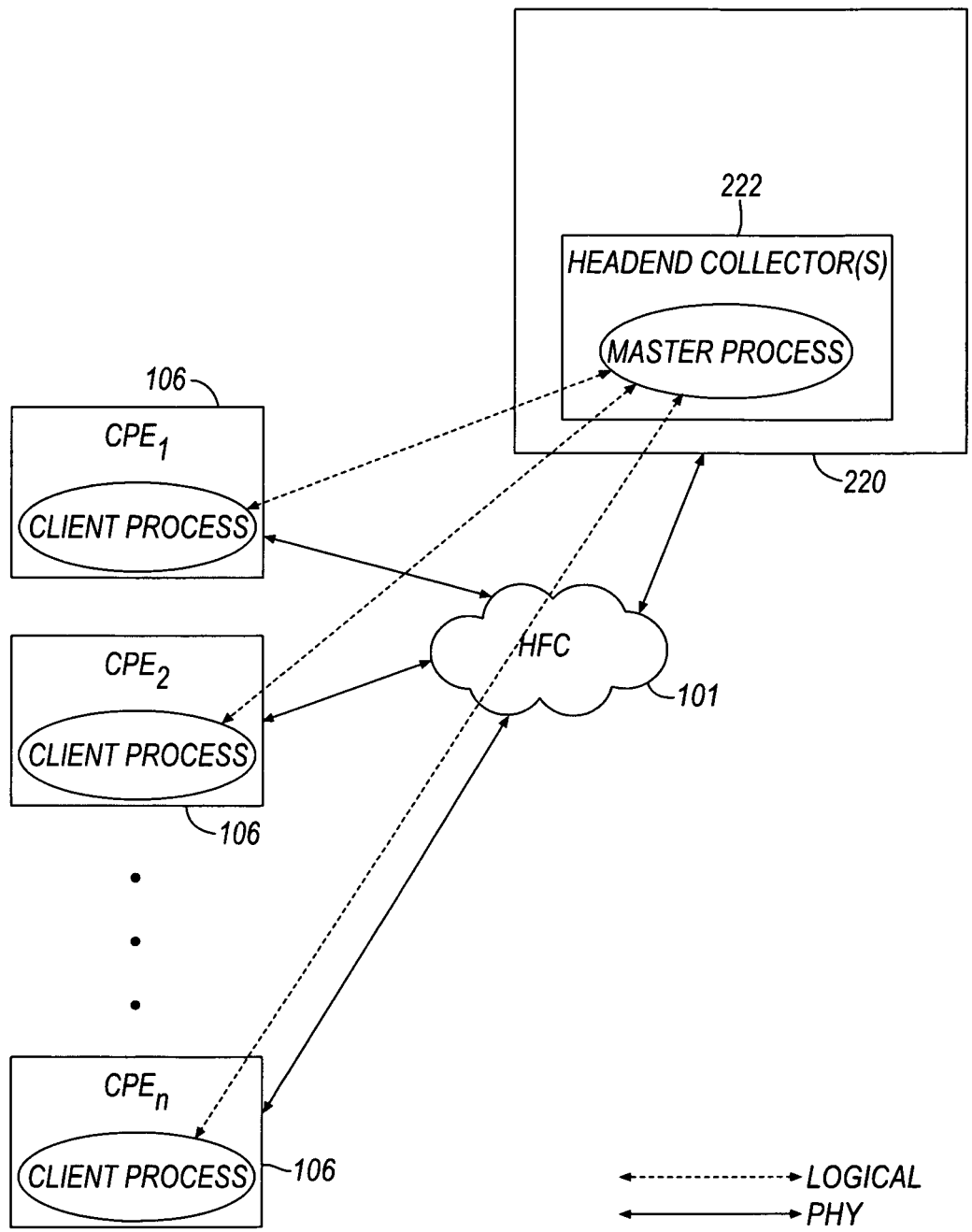
FIG. 2b is a block diagram illustrating one exemplary client/master software architecture according to the invention.

Alternatively, in another variant, a software process resident on each CPE (or selected subsets thereof) can monitor and collect data such as that described above, and package it for transmission to a headend process (e.g., software application running on a headend server or other apparatus). For instance, a distributed application (DA) having client and server portions may be used (see, e.g., FIG. 2b), wherein the client portion collects and assembles required data, and transmits the data in a file or other data structure periodically, or when requested by the server portion.

At step 308, it is determined whether the pattern of interest (and associated audience qualifier) have a "meaningful population" In other words it is determined whether the number of CPE meeting the criteria of the PI (and/or audience qualifier) satisfies a predetermined threshold. In one embodiment, a population is deemed meaningful if a predetermined number or percentage of CPE 106 share the characteristic. Accordingly, at step 308, an entity (such as the enrichment portion 224b of the mediation entity 224) may compare the number of CPE 106 reporting the characteristic. By way of example, suppose an operator determines that tuning to a particular program at a particular time (or within a time range) is to be a pattern of interest. Then, as data is collected regarding CPE 106 which have tuned (or are likely to tune) to the particular program (at step 306), a running total of the number of CPE 106 tuning thereto is maintained. When the number or percentage of CPE 106 tuning to the program exceeds the predetermined threshold, there is a meaningful population within the given definition. Up until the threshold is met, data continues to be collected. In other words the method repeats at step 306; if a population is not large enough to meet the threshold, data collection will continue until enough CPE 106 share the pattern of interest to continue the method 300.

It will be recognized that the analysis of step 308 may be based on historical data (e.g., stored in the database referenced above), that obtained in real-time or contemporaneous with the analysis, or both. For example, one embodiment of the invention uses entirely past or historical data, and determines which of the data to access and use for the population analysis based on which CPE are currently active on the network (e.g., CPE with MAC address "X" has in the past frequently exhibited the pattern of interest, and that CPE is currently active). Alternatively, contemporaneous or real-time data can be added or used solely, such as where a given CPE has just requested a tune to frequency/modulation mode/program number "Y" (corresponding to a given program channel for example), and that tune request is a pattern of interest.

In one embodiment, after a predetermined amount of time has elapsed or data has been collected, the operator may be notified that the pattern of interest is not shared by a sufficient number of CPE 106. In response the operator may either adjust the threshold number/percentage of CPE 106 required to become an meaningful population and/or, may begin again at step 302 and select a different pattern of interest. Moreover, the method of FIG. 3 can be run on different patterns of interest in parallel; e.g., by one or more threads or processes running within the analytical software.

Once a population is determined, at step 310, the population is classified. In one embodiment, the population is classified according to psychographic variables, demographic makeup, behavioral variables, and/or other characteristics such as Claritas PRIZM code, or other market segmenting service code, etc. Exemplary psychographic variables may include, inter alia, preferred genres and actors, interests and hobbies, preferences, as well as other attributes relating to personality, values, attitudes, or lifestyles. Demographic information regards for example race, age, citizenship, income, disabilities, mobility (e.g., length of commute, number of vehicles, etc.), education level, home ownership, employment status, use of services (e.g., wireless or cellular, satellite versus cable, VoIP, etc.), and geographic location.

Behavioral variables regard the type, rate or loyalty with which a person does something (e.g., always/sometimes/never watches a particular program, etc.). For instance, one behavioral classification may relate to consistency; i.e., irrespective of what action is being considered, a given subscriber is extremely consistent (e.g., consistently watches same programs at the same times every week, etc.), which can then be sub-classified if desired (e.g., always watches American Idol at the same time each week). Hence, an advertisement for a program entitled "The Making of American Idol— Behind the Scenes" may have significant penetration with an audience qualified and classified as "consistent" and sub-classified as "consistently watches American Idol".

Yet other variables and types of variables may be used in the classification process of FIG. 3 as well. For instance, predictive or statistical variables (e.g., the probability that someone will take a certain action at present or sometime in the future, and when) may be used. The classified population may then be utilized as will be discussed herein below.

Inventory Generation—

Another aspect of the present invention regards the generation of an inventory to be utilized as a source of profit or to achieve other desired organizational or business goals. In one embodiment, the placement opportunities comprise potentially constrained or predetermined locations relative to primary content where placement of advertisements may be made. The placement opportunities are typically negotiated (e.g., between an MSO and an advertiser), and can be arbitrarily complex or simple (e.g., a one-time occurrence, a periodic or non-periodic series of the same or related placements, etc.). The opportunity is guided by the potential to make a placement (not the placement itself), and the conditions for which the opportunity to make a placement can be presented. It is appreciated that in the exemplary embodiment of the present invention, a placement opportunity alone is not "inventory"; but rather is used in conjunction with the aforementioned data collected regarding an audience to produce a marketable commodity. In other words, inventory is more than merely e.g., a 30 second placement opportunity twice an hour in a linear content stream which is maintained and sold by the MSO for profit. Instead, what is being made purchasable is the determination of a specific audience watching that content stream with the 30-second opportunity.

Placement opportunities may target particular delivery platforms or paradigms, or may be configured to target a plurality of different platforms. Secondary content may be inserted into insertion opportunities found in for example: (i) linear broadcasting i.e., standard video services or switched digital video services (e.g., placing advertisements in a program stream such as that viewed when one turns on a CPE and tunes to a channel like CNN, MTV, HBO, etc.).; (ii) Video on Demand (VOD) (e.g. placing advertisements in VOD assets); and (iii) VODx (e.g., placing advertisements in products that, from the perspective of the MSO are treated as VOD, but, from the point of view of the customer appear unique, such as the "QuickClips" (described in co-owned U.S. Pat. No. 7,174, 126 issued Feb. 6, 2007 and entitled "Technique for effectively accessing programming listing information in an entertainment delivery system" incorporated herein by reference in its entirety), "Startover" (described in co-owned, co-pending U.S. Patent Publication No. 2005/0034171 entitled "Technique for delivering programming content based on a modified network personal video recorder service" incorporated herein by reference in its entirety), "Lookback" (as described in U.S. patent application Ser. No. 10/913,064 filed Aug. 6, 2004 and entitled "TECHNIQUE FOR DELIVERING PRGRAMMING CONTENT BASED ON A MODIFIED NETWORK PERSONAL VIDEO RECORDER SERVICE" incorporated herein by reference in its entirety), and/or "Remote DVR" (as discussed in co-owned U.S. Pat. No. 7,457,520 issued Nov. 25, 2008 and entitled "TECHNIQUE FOR PROVIDING A VIRTUAL DIGITAL VIDEO RECORDER SERVICE THROUGH A COMMUNICATIONS NETWORK" incorporated herein by reference in its entirety) services.

Other delivery platforms include: DVR (e.g., placing advertisements in content played back from storage on the CPE); broadcast overlay (e.g., placing advertisements in graphical overlays placed over broadcast content); program guide (e.g., placing advertisements inside an EPG, IPG, etc.); web page access (e.g., placing advertisements on a web page accessed by a CPE or other Internet-enabled device); telephone interface (e.g., providing advertisements on the user interface of a mobile or other telephone upon launch); messaging (e.g., placing advertisements in messages delivered to CPE); scaled video (e.g., presenting advertisements in a "side bar" or other reduced section of a television screen).

Figure 4:
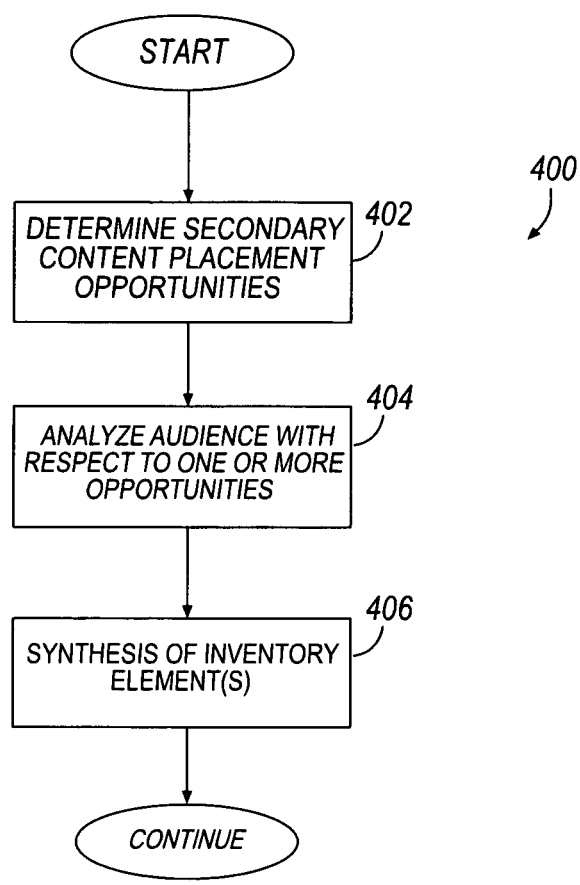
FIG. 4 is a flow diagram illustrating an exemplary method of generating an inventory according to the present invention.

In one embodiment, an inventory is generated according to the method 400 illustrated in FIG. 4. As shown, per step 402, one or more secondary content placement opportunities are determined. The placement opportunities depend on the delivery platform onto which the secondary content is being inserted. Each delivery platform or paradigm may have intrinsic characteristics that affect the determination of placement opportunities. For example, some platforms, like linear broadcasting, are substantially rigid and structured in nature. Insertion opportunities in a linear broadcasting platform are typically negotiated as part of a carriage agreement defined by a network as to approximately when in a broadcast they might occur, and how long they may be. For instance, one such agreement may specify that only two (2) 60-second secondary content insertion opportunities may occur in an hour. In this delivery platform, secondary content placement opportunities may be marked within the content stream (e.g. existence of SCTE 35 cues in the MPEG stream). For other delivery platforms, the number of opportunities may be arbitrary or opportunistic, and thus determination of placement opportunities (step 402) may be strongly correlated to or determined by customer behavior and/or MSO preference.

Per step 404 of the method 400, an analysis of the audience at each placement opportunity is performed. In one embodiment, the analysis may include determination and profiling of the audience qualifiers as described above with respect to FIG. 3. Profiling may be used to describe a certain demographic/psychographic combination (e.g., males 28-35 who like cooking shows). The profile is then mapped to a Boolean combination of audience qualifiers. However, it is appreciated that other methods, etc. may be utilized to characterize an audience of at the placement opportunities as well; the methodology of FIG. 4 is advantageously not limited to one particular characterization scheme or technique, and in fact may use blended or hybridized techniques (e.g., the approach described above with respect to FIG. 3, hybridized with one or more aspects of Nielsen analysis). The placement opportunity information and audience analysis for each placement opportunity are then synthesized (step 406) to generate an output of placement inventory. In one embodiment, the inventory comprises one or more placement opportunities and an audience associated therewith. For example, one inventory item may comprise a 60-second content insertion opportunity in a linear broadcast having an audience substantially comprising 25-37 year old people with a large portion of disposable or discretionary income. As will be described in greater detail below, this inventory item may be exchanged for consideration with an advertiser seeking to market a product or service to that particular audience (including in a dynamic or near-real time auction or sales venue).

In another embodiment, the method 400 for generating an inventory further comprises "proving" the inventory. For example, for each new inventory item, a value proposition and method for proving the item will be presented. Extant or other methods for "proving" new inventory may be utilized in accordance with the present invention. For example, measuring the "performance" may be accomplished by monitoring user actions (such as clicking, tuning away, fast forwarding, etc.), and/or by utilizing tactics to adjust the placements of the secondary content in an effort to achieve higher conversion ratios (i.e., conversion of advertisement or promotion "impressions" to actual sales and/or ensuring that more profitable orders are fulfilled preferentially to less profitable ones in the case of limited inventory). Conversion ratios are proof of sold inventory, and will give future inventory with similar characteristics increased value for the MSO or provider, in that the inventory has essentially been demonstrated to be effective (at least to a specified degree of performance) for its intended purpose.

Individualized Content Channel Variants—

In another aspect of the invention, the foregoing techniques may be combined with personalized virtual or other content channel approaches to, inter alia, leverage data relating to user behavior on a per-user basis. See for example co-owned and co-pending U.S. patent application Ser. No. 12/414,554 filed Mar. 30, 2009 entitled "Personal Media Channel Apparatus and Methods" which is incorporated herein by reference in its entirety, which discloses methods and apparatus for "fused" targeted content delivery in a content-based network.

Specifically, a substantially user-friendly mechanism for viewing content compiled from various sources is provided, including, inter cilia, DVR, broadcast, VOD, Start Over, etc. Content selected to align with a user's preferences is displayed as a substantially continuous stream as part of a "virtual" user-based channel. In one embodiment, a user profile is constructed and targeted content gathered without requiring any user intervention whatsoever; e.g., based on a user's past or contemporaneous interactions with respect to particular types of content. This information can be generated by, for example, a recommendation "engine" such as that described in co-owned and co-pending U.S. patent application Ser. No. 12/414,576 filed Mar. 30, 2009 entitled "Recommendation Engine Apparatus and Methods" which is also incorporated herein by reference in its entirety. The "virtual channel" acts as a centralized interface for the user and their content selections and preferences, as if the content relevant to a given user were in fact streamed over one program channel. The compiled content may also presented to the user in the form of a "playlist" from which a user may select desired content for viewing and/or recording. The user is able to navigate between on-demand content, the virtual channel, an EPG, a search tool, and a DVR navigation tool from a single user interface (e.g., on-screen display).

In another aspect, client applications (e.g., those disposed on a subscriber's CPE and/or network servers) are utilized to compile the playlist based on user-imputed as well as pre-programmed user profiles. Various feedback mechanisms may also be utilized to enable the client application to "learn" from the user's activities in order to update the user profile and generate more finely-tuned and cogent recommendations. Client applications may also be utilized to manage the seamless presentation of content on the virtual channel, and locate/flag various scenes inside selected content for user viewing or editing.

Accordingly, in one variant of the present invention, selections or viewing habits obtained and used to populate the programming for the aforementioned virtual personalized channel can be used as the basis for targeted advertising. Specifically, by knowing what a particular user's preferences or habits are, targeting of advertising can occur on a per-user basis in multi-user environments (e.g., family residences or households). This capability is enabled by the foregoing data and recommendations generated by the recommendation engine (i.e., "estimated" preferences), and/or actual user input or selections ("actual" data), the former which may also be based in part on the latter in certain embodiments. The aforementioned virtual channel can be set up on a per-user basis (e.g., each member of a family having their own virtual channel), and hence the demographics and habits of that family are more precisely known than a technique such as Nielsen, which treats the family as an aggregated entity.

CPE—

Figure 5:
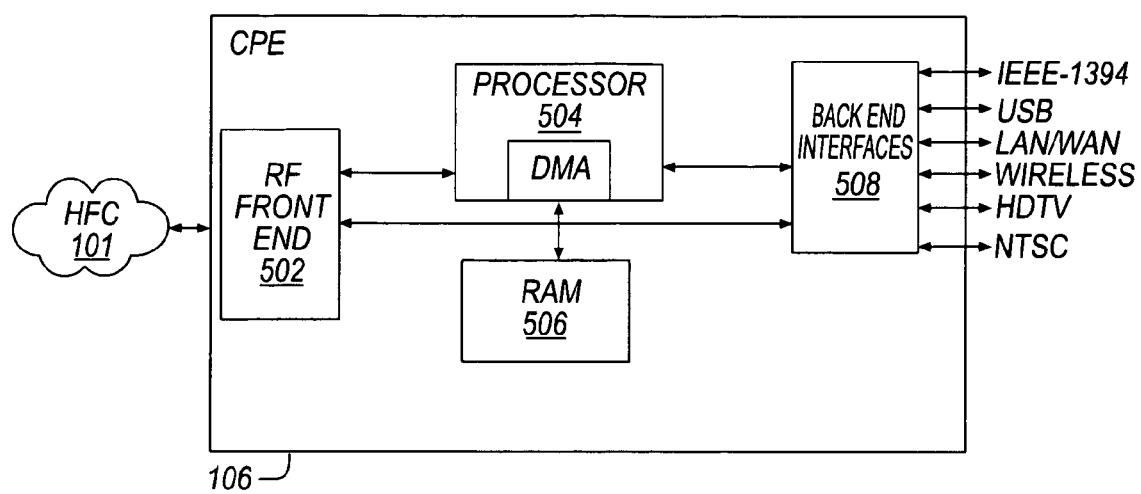
FIG. 5 is a functional block diagram illustrating an exemplary embodiment of CPE adapted to support data collection and transmission functionality.

FIG. 5 illustrates an exemplary embodiment of the improved CPE 106 according to the present invention. It will be appreciated that in MSO implementations where no CPE or client portion of the data collection software process is used, literally any type of CPE 106 that is compatible with the bearer network may be used. However, in cases where a client portion is desired (e.g., to obtain subscriber/use/CPE profile or operational data and send it back upstream to the APCSM network portion), the following exemplary configuration may be used.

As shown in the simplified diagram of FIG. 5, the exemplary device 106 generally comprises an OpenCable (OCAP)-compliant embedded system having an RF front end 502 (including tuner and demodulator/decryptors) for interface with the HFC network 101 of FIGS. 1-1c, digital processor(s) 504, storage device 506, and a plurality of interfaces 508 (e.g., video/audio interfaces, IEEE-1394 "Firewire", USB, serial/parallel ports, etc.) for interface with other end-user apparatus such as televisions, personal electronics, computers, WiFi or other network hubs/routers, etc. Other components which may be utilized within the device (deleted from FIG. 5 for simplicity) various processing layers (e.g., DOCSIS MAC or DAVIC OOB channel, MPEG, etc.) as well as media processors and other specialized SoC or ASIC devices. The CPE 106 may also comprise an integrated HD decoder, thereby relieving any connected monitors or other devices from the requirement of having such a decoder. These additional components and functionality are well known to those of ordinary skill in the cable and embedded system fields, and accordingly not described further herein.

The CPE 106 of FIG. 5 is also provided with an OCAP 1.0—compliant application and Java-based middleware which, inter alia, manages the operation of the device and applications running thereon (including the aforementioned client software process where used). It will be recognized by those of ordinary skill that myriad different device and software architectures may be used consistent with the tuning functions of the present invention, the device of FIG. 5 being merely exemplary. For example, different middlewares (e.g., MHP, ARIB, or ACAP) may be used in place of the OCAP middleware of the illustrated embodiment.

The exemplary CPE 106 further comprises a conventional "Watch TV" application or the like, which services those program or user channels available over the network. The Watch TV application, residing in memory, provides such functions as channel navigation control, channel selection in response to a channel change event, etc. In one embodiment, the Watch TV (or EPG) application further comprises all necessary functionality need to support the data collection client process.

In another embodiment, the CPE 106 comprises a converged premises device, such as for example that described in co-owned and co-pending U.S. patent application Ser. No. 11/378,129 filed Mar. 16, 2006 and entitled "METHODS AND APPARATUS FOR CENTRALIZED CONTENT AND DATA DELIVERY", incorporated herein by reference in its entirety.

As previously noted, the CPE 106 of FIG. 5 further comprises a client portion of a distributed application (see FIG. 2b) configured to collect and/or transmit data, in the form of e.g., a software application running on the CPE. This software application may be configured to perform any number of functions relating to targeted advertising or promotion delivery, including without limitation: (i) forming a cryptographic hash of one or more CPE-specific variables in order to maintain the anonymity of the CPE/subscriber with respect to historical or profile data, as previously described; (ii) generating "telescoping" advertisement interfaces or other user interfaces that allow the subscriber to interact with the CPE; (iii) collecting data on user-specific activities such as tuning or activity logs, power on/off times/duration, PPV/VoD requests, frequency of use of other ancillary functions associated with the CPE, DVR or monitor operation and use (such as via communications from a connected DVR or monitor device), etc.; (iv) identifying and communicating CPE hardware or software errors logged by the middleware; (v) identifying and communicating new hardware or software components logged with the middleware registry, and so forth.

As previously noted, any data of interest may be directly transmitted to the upstream software portion (e.g., via an OOB message or other communication), or stored or logged in a file and sent when requested by the system 200 (or according to other models, such as being sent periodically, on CPE startup, etc.). Moreover, the network system 200 can also receive and log events during the normal course of operations (in conjunction with any data obtained and forwarded by the CPE software client or other processes running thereon), such as e.g., upstream OD content requests, PPV requests, LSCP "trick mode" commands, EPG update requests, etc.

Business Methods and Considerations—

Various exemplary business-related aspects of present invention are now described in greater detail.

In one aspect of the invention, access to information regarding the classified audience qualifiers may be provided as an incentive or for consideration to certain advertisers (e.g., those willing to pay higher premiums for access thereto). For example, access to certain qualifier data and/or delivery platforms may vary depending on an advertiser's payment.

Moreover, a user may elect not to have personal identifying information or data (or subsets thereof) regarding viewership collected and transmitted, and/or not to have any such data collected utilized for targeted content generation and insertion and/or recommendation. Thus, an incentive may be offered to those users who affirmatively agree to collection and transmission of audience research data and/or to targeted insertion or recommendation of content. For example, a user may be offered the targeted content free or at a reduced price (if it is purchasable content, such as VOD, Pay-per-View etc.), or may be offered other services at no charge or at a reduced price.

In another aspect of the invention, the advertising or promotional inventory is provided to potential advertisers via dynamic or near-real time interface which permits opportunities to be published in near real time, and advertising decisions to be made accordingly. For instance, in one embodiment, placement opportunities/inventory are determined in a rolling fashion (e.g., updated in a substantially continuous manner) and published to an interface such as a website or the like run by the MSO or a proxy, where prospective advertisers can view the opportunities, and select them. One such model allows pre-registered advertisers to establish an account and access the website (such as via a login or other authentication criteria). Existing advertisements of an advertiser may be pre-stored (such as on the advertising content database previously described), or alternatively may be directly uploaded to the MSO/proxy web site in a prescribed format. The uploaded content can then be "ingested" into the network, and any requisite processing (such as transcoding or transrating, splicing, etc.) performed before delivery to the mechanism which will insert the advertisement or promotion into the desired opportunity and platform (e.g., spliced into a MPTS or MPEG-2 transport stream on a cable network).

Advantageously, the methods and apparatus of the present invention can be used with any number of different advertising insertion or splicer architectures, whether analog, digital or hybrid in nature. See, for example, co-pending and co-owned U.S. patent application Ser. No. 10/662,776 filed Sep. 15, 2003 entitled "SYSTEM AND METHOD FOR ADVERTISEMENT DELIVERY WITHIN A VIDEO TIME SHIFTING ARCHITECTURE" (published as patent publication No. 20050060745 on Mar. 17, 2005), which is incorporated by reference herein in its entirety, for exemplary advertising insertion and splicer apparatus and methods in the context of, e.g., networked digital video recorder (nDVR) or VoD delivery paradigms.

The selection, payment and insertion by the advertiser may also be made fully automated if desired, such as where available inventory is described according to a prescribed set of parameters and protocol which can be interpreted by an application of the advertiser. For instance, in the foregoing example of a 60-second content insertion opportunity in a linear broadcast having an audience substantially comprising 25-37 year old people with a large portion of disposable or discretionary income, a prescribed data structure such as a tuple, ordered sequence or pair, or the like well known in the mathematical arts can be used as a descriptor of this opportunity (e.g., {60, 25, 37, 0, 1}, with "60" comprising a run-length field (in seconds), "25" and "37" corresponding to lower and upper demographic range values, "0" indicating sex-agnostic (i.e., no data with respect to breakdown of male versus female viewers), and "1" indicating highest level of disposable income). An advertiser application can receive such information (such as via unicast or multicast transmission, or other delivery or access mechanism), read and interpret the data structure, and apply decision logic as to whether the "posted" opportunity meets acceptance criteria (which may also include the cost of the opportunity). As one simple example, a 75% or greater match of the above-listed tuple on a per-component basis (i.e., at least 75% of the five components of the tuple match) may be used as an acceptance criterion. Other criteria will also be readily appreciated by those of ordinary skill given the present disclosure.

Moreover, the posting of placement opportunities or inventory can also be accomplished via an auction-type mechanism; e.g., via a website or other interface where prospective advertisers submit bids (whether blind or in view of other bidders) for a given upcoming opportunity.

It will also be recognized that pricing of inventory or placement opportunities can be dynamically set based on other considerations, such as for example based on proximity in time to the actual opportunity. For instance, pricing may change (increase) as the placement opportunity approaches, akin to airline ticket pricing. As another alternative, pricing may be a function of the number of advertisers interested in a given inventory item (e.g., where two or more separate advertisers are interested in a given inventory item, the item may go to the first advertising will to pay a prescribed "premium"). Other business-related aspects of the present invention may be appreciated given the foregoing disclosure. For example, inventory may also be auctioned, or provisioned based on loyalty or context (e.g., navigation based, day/time based, etc.). Further, inventory may be bundled to provide part of a campaign across several different platforms and/or devices.

Operations/Business Rules Engine—

In another aspect of the invention, the aforementioned audience classification system 220 (e.g., including one or more computer programs) optionally includes an entity having an operations and/or business rules "engine". This engine comprises, in an exemplary embodiment, a series of software routines that are adapted to control the generation, analysis and transmission of audience classification data. These rules may also be fully integrated within the aforementioned one or more computer programs and be controlled via the entity on which the program is run. In effect, the rules engine comprises a supervisory entity which monitors and selectively controls the generation, analysis, and/or transmission functions at a higher level, so as to implement desired operational or business rules of the MSO or other parties of interest.

The rules engine can be considered an overlay of sorts to the algorithms of the previously described computer applications. For example, the exemplary computer application may invoke certain operational protocols or decision processes based on data received (e.g., historical activity or user data, subscriber preferences, etc.), as well as network operational or historical data, demographic data, geographic data, etc. However, these processes may not always be compatible with higher-level business or operational goals, such as maximizing profit on a network-wide basis (or after consideration of other factors not examined by the collecting entities such as advertising revenue, RTA/acquisition costs, "costs" of delivering streams based on required bandwidth, taxes, maintenance or repair costs, additional equipment leasing or use costs, etc.), or system reliability and/or flexibility. Moreover, the computer application being "supervised" may be operating on a per-CPE, per-household, or per-request basis (i.e., evaluating each individual CPE effectively in isolation, and generating an insertion decision without considering larger patterns or decisions being made in the service group or network as a whole).

Hence, when imposed, the business/operational rules of the engine can be used to dynamically (or manually) control the operation of the aforementioned processes in conjunction with the generation, analysis, and/or transmission functions previously described.

For example, one rule implemented by the rules engine may comprise selectively transmitting or analyzing data regarding viewership only from certain users; e.g., those who have agreed to have their viewership data collected. Accordingly, only those users who affirmatively "opt in" will have audience research data collected about their household or CPE 106. In another variant, insertion and/or recommendation of targeted content is provided only to users who agree to have viewership data collected.

As another alternative, inventory may only be assigned to given advertisers who meet certain reliability and/or quality standards, or who have been pre-qualified by the MSO (irrespective of whether they would add revenue or profit for the MSO).

It will be recognized that while certain aspects of the invention are described in terms of a specific sequence of steps of a method, these descriptions are only illustrative of the broader methods of the invention, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the invention disclosed and claimed herein.

While the above detailed description has shown, described, and pointed out novel features of the invention as applied to various embodiments, it will be understood that various omissions, substitutions, and changes in the form and details of the device or process illustrated may be made by those skilled in the art without departing from the invention. This description is in no way meant to be limiting, but rather should be taken as illustrative of the general principles of the invention. The scope of the invention should be determined with reference to the claims.

What is claimed is:

1. Content management apparatus for use within a content delivery network, said apparatus comprising:
   an advertising subsystem having an advertising content store, said advertising subsystem configured to identify at least one advertising placement opportunity in delivered content;
   a data collection subsystem;
   a processing subsystem in data communication with said data collection subsystem;
   a data storage subsystem in data communication with said processing subsystem, said data storage subsystem configured to store user-related data; and an anonymization module configured to substantially anonymize at least portions of said user-related data, said anonymized user-related data being stored in said data storage subsystem based on at least one anonymous identifier;

wherein said data collection subsystem is configured to gather said user-related data, and said processing subsystem is configured to process said user-related data and generate an advertising product based at least in part on said processed user-related data and said at least one placement opportunity;

wherein said processing subsystem is further configured to assign a plurality of parameters configured to describe said advertising product and enable an automatic purchase of a particular one of said advertising product when at least a percentage across said plurality of parameters relating to said particular one of said advertising product matches a purchaser-determined threshold percentage identified by said purchaser; and wherein said at least one anonymous identifier comprises a cryptographic hash of at least a media access control (MAC) address associated with a consumer premises equipment (CPE) of a user.

2. The apparatus of claim 1, wherein said processing subsystem comprises an enrichment module configured to enrich said collected user-related data in at least one aspect.

3. The apparatus of claim 1, wherein said advertising content store comprises a plurality of advertisements or promotions from a plurality of different advertisers.

4. The apparatus of claim 1, wherein said advertising product comprises an advertising inventory element, said element comprising:
  (i) data related to said at least one placement opportunity; and
  (ii) data related to at least one of a user demographic or psychographic associated with said at least one placement opportunity.

5. The apparatus of claim 3, wherein at least a portion of said plurality of advertisements or promotions from said plurality of different advertisers have descriptive metadata associated therewith, said metadata being used by said processing subsystem to identify potential candidate advertisements or promotions for a given one of said at least one placement opportunity.

6. The apparatus of claim 3, wherein at least a portion of said plurality of advertisements or promotions from said plurality of different advertisers each comprise descriptive metadata associated therewith, said metadata being used by said processing subsystem to determine a suitability of a given advertisement or promotion for said advertising product.

7. A method of generating an inventory element in a content delivery network, said method comprising:
  determining, at an entity of said content delivery network, an opportunity for placement of at least one of a plurality of advertisements in a content stream, said opportunity for placement comprising a plurality of parameters descriptive thereof;
  determining one or more qualities of an audience of said opportunity for placement;
  generating an inventory element comprising a synthesis of said one or more qualities of said audience and said plurality of parameters descriptive of said opportunity for placement, at said entity of said content delivery network;
  charging a source of said at least one of a plurality of advertisements a premium for access to said synthesis of said one or more qualities of said audience and said plurality of parameters descriptive of said opportunity for placement;
  enabling an automatic purchase of said at least one of said plurality of advertisements when it is determined that at least a percentage across said plurality of parameters descriptive of said opportunity for placement matches a purchaser-determined threshold percentage identified by said source;
  wherein said access to any information about said synthesis of said one or more qualities of said audience and said opportunity for placement is not provided to said source of said at least one of said plurality of advertisements when said premium is not paid.

8. The method of claim 7, wherein said one or more qualities of said audience comprise one or more of psychographic, geographic, demographic, and/or behavioral data.

9. The method of claim 7, further comprising selecting a second one or more of said plurality of advertisements based at least in part on a relationship thereof to said one or more qualities of said audience.

10. The method of claim 7, wherein said inventory element comprises a prioritized list of said plurality of advertisements, a priority of said list based at least in part on a relationship between said one or more qualities of an audience of said opportunity for placement and one or more attributes of a target audience of each of said plurality of advertisements.

11. The method of claim 7 wherein said act of generating said inventory element is performed at least in part at a headend entity of a cable network.

12. The method of claim 7, wherein said entity of said content delivery network comprises a network headend.

13. The method of claim 9, wherein said selection is further based at least in part on one or more factors regarding potential for revenue.

14. The method of claim 9, further comprising generating a ranked list of said plurality of advertisements based at least in part on said relationship.

15. A non-transitory computer readable apparatus comprising media adapted to contain a computer program comprising a plurality of instructions, which are configured to, when executed:
  determine one or more opportunities for insertion of one or more of a plurality of available advertisements;
  access data related to a plurality of users;
  generate an output comprising an inventory of individual ones of said one or more opportunities for insertion having a plurality of users associated therewith that share a plurality of characteristics with a respective plurality of characteristics of at least one of said plurality of available advertisements;
  assign a monetary value to at least one individual one of said one or more opportunities for insertion, said monetary value being based at least in part on a time period that remains before an occurrence of said at least one individual one of said one or more opportunities for insertion; and
  enable an automated purchase of said one or more opportunities for insertion by a provider of one or more of said plurality of available advertisements when a pre-defined threshold monetary value in a purchaser profile of a purchaser is at least met by said assigned monetary value and when a percentage of said characteristics of said plurality of users associated with said one or more opportunities which match said plurality of characteristics of said plurality of available advertisements matches a purchaser-determined threshold percentage identified by said purchaser.

16. The apparatus of claim 15, wherein said apparatus comprises a hard disk drive of a computerized host apparatus, said host apparatus being in data communication with a two-way content delivery network.

17. The apparatus of claim 15, wherein said computer program further comprises instructions which, when executed, cause at least a portion of said generated output to be transmitted to an entity which posts or makes said inventory available to at least one advertiser.

18. The apparatus of claim 15, wherein said access of data related to said plurality of users occurs via access to a data file related to activities of one or more subscribers of a content delivery network, said data file comprising information collected from one or more customer premises equipment associated with respective ones of said one or more subscribers.

19. The apparatus of claim 17, wherein said transmission to an entity which posts or makes said inventory available to at least one advertiser further formats said at least portion of said generated output based at least in part on a data structure or protocol which allows for a machine-readable version of said at least portion of generated output.

20. A non-transitory computer readable apparatus comprising media adapted to contain a computer program comprising a plurality of instructions, which are configured to, when executed:
- determine, at an entity of said content delivery network, an opportunity for placement of at least one of a plurality of advertisements in a content stream;
- determine a plurality of qualities of an audience of said opportunity for placement;
- evaluate said a plurality of qualities of said audience and said opportunity for placement, at said entity of said content delivery network; and
- charge a source of said at least one of a plurality of advertisements a premium for access to information about said evaluation of said one or more qualities of said audience and said opportunity for placement;
- enable an automatic purchase of said opportunity for placement when at least a percentage of said plurality of qualities of said audience matches a source-determined threshold percentage identified by said source;
- wherein said access to any of said information about said evaluation of said one or more qualities of said audience and said opportunity for placement is not provided to said source of said at least one of said plurality of advertisements when said premium is not paid.

* * * * *